US011231512B2

(12) United States Patent
Yang

(10) Patent No.: US 11,231,512 B2
(45) Date of Patent: *Jan. 25, 2022

(54) APPARATUS AND METHODS OF EVALUATING ROCK PROPERTIES WHILE DRILLING USING ACOUSTIC SENSORS INSTALLED IN THE DRILLING FLUID CIRCULATION SYSTEM OF A DRILLING RIG

(71) Applicant: Saudi Arabian Oil Company, Dhahran (SA)

(72) Inventor: Yunlai Yang, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 223 days.

This patent is subject to a terminal disclaimer.

(21) Appl. No.: 16/719,388

(22) Filed: Dec. 18, 2019

(65) Prior Publication Data
US 2020/0166662 A1 May 28, 2020

Related U.S. Application Data

(63) Continuation of application No. 16/183,037, filed on Nov. 7, 2018, now Pat. No. 10,551,516, which is a
(Continued)

(51) Int. Cl.
*G01V 1/16* (2006.01)
*G01V 1/50* (2006.01)
(52) U.S. Cl.
CPC ............. *G01V 1/168* (2013.01); *G01V 1/162* (2013.01); *G01V 1/50* (2013.01); *G01V 2200/16* (2013.01);
(Continued)

(58) Field of Classification Search
CPC .......... G01V 1/168; G01V 1/162; G01V 1/50; G01V 2200/16; G01V 2210/1216; G01V 2210/1425
(Continued)

(56) References Cited

U.S. PATENT DOCUMENTS 2,155,609 A 4/1939 Owsley et al.
3,583,219 A 6/1971 Lunstroth et al.
(Continued)

FOREIGN PATENT DOCUMENTS

CA 2157101 A1 3/1997
CA 2508404 A1 11/2006
(Continued)

OTHER PUBLICATIONS

European Examination Report for Application No. 12783703.7 (SA797/EP); dated Jan. 20, 2017; (pp. 1-6).
(Continued)

*Primary Examiner* — Justin C Mikowski
(74) *Attorney, Agent, or Firm* — Bracewell LLP; Constance G. Rhebergen; Brian H. Tompkins

(57) ABSTRACT

Apparatus and methods of identifying rock properties in real-time during drilling, are provided. An apparatus includes an acoustic sensor installed in a drilling fluid circulation system of a drilling rig, the acoustic sensor coupled to one of the following: (i) a bell nipple, (ii) a gooseneck, or (iii) a standpipe. Raw acoustic sensor data generated real-time as a result of rotational contact of the drill bit with rock during drilling is received, and a plurality of acoustic characteristics are derived from the raw acoustic sensor data. The lithology type of rock undergoing drilling may be determined from the acoustic characteristics. Petrophysical properties of the rock undergoing drilling may be determined using a petrophysical properties evaluation algo-
(Continued)

rithm employable to predict the petrophysical properties of rock undergoing drilling from the raw acoustic sensor data.

33 Claims, 13 Drawing Sheets

Related U.S. Application Data continuation-in-part of application No. 13/554,369, filed on Jul. 20, 2012, now Pat. No. 10,180,061.

(60) Provisional application No. 61/539,171, filed on Sep. 26, 2011.

(52) U.S. Cl.
CPC ............... *G01V 2210/1216* (2013.01); *G01V 2210/1425* (2013.01)

(58) Field of Classification Search
USPC .......................................................... 703/10
See application file for complete search history.

(56) References Cited

U.S. PATENT DOCUMENTS

| | | |
|---|---|---|
| 3,626,482 A | 12/1971 | Raynaud et al. |
| 3,948,322 A | 4/1976 | Baker |
| 3,980,986 A | 9/1976 | Baird et al. |
| 4,303,994 A | 12/1981 | Tanguy |
| 4,349,071 A | 9/1982 | Fish |
| 4,578,675 A | 3/1986 | MacLeod |
| 4,715,451 A | 12/1987 | Bseisu et al. |
| 4,928,521 A | 5/1990 | Jardine |
| 4,964,087 A | 10/1990 | Widrow |
| 4,965,774 A | 10/1990 | Ng et al. |
| 4,992,997 A | 2/1991 | Bseisu |
| 5,109,925 A | 5/1992 | Stepp et al. |
| 5,128,901 A | 7/1992 | Drumheller |
| 5,141,061 A | 8/1992 | Henneuse |
| 5,144,298 A | 9/1992 | Henneuse |
| 5,159,226 A | 10/1992 | Montgomery |
| 5,248,857 A | 9/1993 | Ollivier |
| 5,272,925 A | 12/1993 | Henneuse et al. |
| 5,289,354 A | 2/1994 | Clayer et al. |
| 5,303,203 A | 4/1994 | Kingman |
| 5,347,859 A | 9/1994 | Henneuse et al. |
| 5,448,227 A | 9/1995 | Richardson et al. |
| 5,448,911 A | 9/1995 | Mason |
| 5,510,582 A | 4/1996 | Birchak et al. |
| 5,602,541 A | 2/1997 | Wallis et al. |
| 5,678,643 A | 10/1997 | Minear et al. |
| 5,738,171 A | 4/1998 | Szarka |
| 5,774,418 A | 6/1998 | Magendie et al. |
| 5,924,499 A | 7/1999 | Birchak et al. |
| 6,023,444 A | 2/2000 | Naville et al. |
| 6,088,294 A | 7/2000 | Leggett, III et al. |
| 6,199,018 B1 | 3/2001 | Quist et al. |
| 6,267,185 B1 | 7/2001 | Hutin et al. |
| 6,320,820 B1 | 11/2001 | Gardner et al. |
| 6,520,257 B2 | 2/2003 | Allamon et al. |
| 6,583,729 B1 | 6/2003 | Gardner et al. |
| 6,648,082 B2 | 11/2003 | Schultz et al. |
| 6,681,185 B1 | 1/2004 | Young et al. |
| 6,681,633 B2 | 1/2004 | Osborne, Jr. et al. |
| 6,712,160 B1 | 3/2004 | Osborne, Jr. et al. |
| 6,714,138 B1 | 3/2004 | Biglin, Jr. et al. |
| 6,891,481 B2 | 5/2005 | Dubinsky et al. |
| 6,909,667 B2 | 6/2005 | Dudley et al. |
| 6,920,085 B2 | 7/2005 | Warren et al. |
| 6,940,420 B2 | 9/2005 | Jenkins |
| 7,036,363 B2 | 5/2006 | Yogeswaren |
| 7,068,183 B2 | 6/2006 | Kyle et al. |
| 7,142,986 B2 | 11/2006 | Moran |
| 7,274,992 B2 | 9/2007 | Dewhurst et al. |
| 7,289,909 B2 | 10/2007 | Thomann et al. |
| 7,357,197 B2 | 4/2008 | Schultz et al. |
| 7,404,456 B2 | 7/2008 | Weaver et al. |
| 7,458,257 B2 | 12/2008 | Pop et al. |
| 7,480,207 B2 | 1/2009 | Marsh |
| 7,516,015 B2 | 4/2009 | Sinha et al. |
| 7,530,407 B2 | 5/2009 | Tchakarov et al. |
| 7,571,777 B2 | 8/2009 | Wylie et al. |
| 7,590,029 B2 | 9/2009 | Tingley |
| 7,652,951 B2 | 1/2010 | Leggett et al. |
| 7,675,816 B2 | 3/2010 | Mathiszik et al. |
| 7,735,579 B2 | 6/2010 | Gopalan et al. |
| 7,757,759 B2 | 7/2010 | Jahn et al. |
| 7,764,572 B2 | 7/2010 | Wu et al. |
| 7,817,062 B1 | 10/2010 | Li et al. |
| 7,841,425 B2 | 11/2010 | Guimerans et al. |
| 7,859,426 B2 | 12/2010 | Clark et al. |
| 7,913,773 B2 | 3/2011 | Li et al. |
| 7,966,874 B2 | 6/2011 | Hassan et al. |
| 7,974,451 B2 | 7/2011 | Matsumoto |
| 8,004,421 B2 | 8/2011 | Clark |
| 8,281,856 B2 | 10/2012 | Jahn et al. |
| 8,798,978 B2 | 8/2014 | Ertas et al. |
| 9,234,974 B2 | 1/2016 | Yang |
| 9,568,629 B2 | 2/2017 | Almarhoon et al. |
| 9,624,768 B2 | 4/2017 | Yang |
| 9,664,039 B2 | 5/2017 | Neale et al. |
| 2002/0096363 A1 | 7/2002 | Evans et al. |
| 2002/0116128 A1 | 8/2002 | Sinha et al. |
| 2002/0195276 A1 | 12/2002 | Dubinsky et al. |
| 2003/0010495 A1 | 1/2003 | Mendez et al. |
| 2003/0072217 A1 | 4/2003 | Macpherson |
| 2003/0168257 A1 | 9/2003 | Aldred et al. |
| 2004/0159428 A1 | 8/2004 | Hammond et al. |
| 2004/0200613 A1 | 10/2004 | Fripp et al. |
| 2005/0100414 A1 | 5/2005 | Salama |
| 2006/0076161 A1 | 4/2006 | Weaver et al. |
| 2006/0120217 A1 | 6/2006 | Wu et al. |
| 2007/0030762 A1 | 2/2007 | Huang et al. |
| 2007/0189119 A1 | 8/2007 | Klotz et al. |
| 2008/0056067 A1 | 3/2008 | Jogi et al. |
| 2008/0285386 A1 | 11/2008 | Sinanovic et al. |
| 2009/0067286 A1 | 3/2009 | Bose et al. |
| 2009/0195408 A1 | 8/2009 | Paiiersonetal |
| 2009/0199072 A1 | 8/2009 | Akimov et al. |
| 2009/0201170 A1 | 8/2009 | Reckmann et al. |
| 2009/0250225 A1 | 10/2009 | Zaeper et al. |
| 2010/0008188 A1 | 1/2010 | Hall et al. |
| 2010/0038135 A1 | 2/2010 | Hummes et al. |
| 2010/0118657 A1 | 5/2010 | Trinh et al. |
| 2010/0195442 A1 | 8/2010 | Reyes et al. |
| 2010/0200295 A1 | 8/2010 | Schimanski et al. |
| 2010/0268491 A1 | 10/2010 | Brink et al. |
| 2010/0284247 A1 | 11/2010 | Manning et al. |
| 2010/0305864 A1 | 12/2010 | Gies |
| 2011/0005835 A1 | 1/2011 | Li |
| 2011/0067928 A1 | 3/2011 | Huldén et al. |
| 2011/0073303 A1 | 3/2011 | Taherian et al. |
| 2011/0164468 A1 | 7/2011 | Robbins et al. |
| 2012/0273270 A1 | 11/2012 | Rasheed |
| 2013/0075157 A1 | 3/2013 | Yang et al. |
| 2013/0075159 A1 | 3/2013 | Yang |
| 2013/0075160 A1 | 3/2013 | Yang |
| 2013/0075161 A1 | 3/2013 | Yang |
| 2013/0080060 A1 | 3/2013 | Yang |
| 2013/0080065 A1 | 3/2013 | Yang |
| 2018/0171772 A1 | 6/2018 | Rodney |

FOREIGN PATENT DOCUMENTS

| | | |
|---|---|---|
| EP | 0718641 A2 | 6/1996 |
| EP | 2236744 A2 | 10/2010 |
| GB | 2288197 A | 10/1995 |
| WO | 199727502 A1 | 7/1997 |
| WO | 2013049014 A1 | 4/2013 |
| WO | 2013049044 A1 | 4/2013 |
| WO | 2013049111 A1 | 4/2013 |

(56) References Cited

FOREIGN PATENT DOCUMENTS

| WO | 2013049124 A1 | 4/2013 |
|---|---|---|
| WO | 2013049140 A1 | 4/2013 |
| WO | 2013049158 A1 | 4/2013 |

OTHER PUBLICATIONS

Final Office Action issued in co-pending U.S. Appl. No. 13/553,958 (SA5001) dated Dec. 17, 2015; 30 pages.
Final Office Action issued in co-pending U.S. Appl. No. 13/554,019 (SA761) dated Jan. 22, 2016; 12 pages.
Gao, DVL Technology, retrieved at http://chinada-international.com/Tech/e_index.htm on Jul. 18, 2011, 2 pages.
Gao, L., et al.; "Limits on Data Communication Along the Drillstring Using Acoustic Waves" Society of Petroleum Engineers, SPE Annual Technical Conference and Exhibition, Oct. 9-12, 2005, paper No. 95490-MS, Dallas, TX (1 page).
Gradi, Christian et al.; "An Analysis of Noise Characteristics of Drill Bits" Society of Petroleum Engineers, SPE Annual Technical Conference and Exhibition, Sep. 21-24, 2008, paper No. 115987-MS, Denver, CO. (1 page).
Gwilliam, W. et al.; "Advanced Seismic While Drilling System" Oil & Natural Gas Projects, Exploration & Production Technologies, DE-FC26-04NT42242, Technology International, Inc., Kingwood, TX, Sep. 30, 2006 (2 pages).
International Search Report and Written Opinion for related PCT Application No. PCT/US2012/028994 (SA702/PCT); Report dated Sep. 4, 2013 (pp. 1-16).
International Search Report and Written Opinion for related PCT Application No. PCT/US2012/057039 (SA759/PCT); Report dated Aug. 21, 2013 (pp. 1-12).
International Search Report and Written Opinion for related PCT Application No. PCT/US2012/057084 (SA5002/PCT); Report dated Aug. 21, 2013 (pp. 1-11).
International Search Report and Written Opinion for related PCT Application No. PCT/US2012/057201 (SA761/PCT); Report dated Sep. 25, 2013 (pp. 1-14).
International Search Report and Written Opinion for related PCT Application No. PCT/US2012/057222 (SA5001/PCT); Report dated Aug. 7, 2013 (pp. 1-10).
International Search Report and Written Opinion for related PCT Application No. PCT/US2012/057244 (SA758/PCT); Report dated Sep. 23, 2013 (pp. 1-11).
Kristensen et al. "Characteristics of Drill Bit Generated Noise" Paper No. 1990-X, Society of Petrophysicists & Well Log Analysts, SPWLA 31st Annual Logging Symposium, 1990 (1 page).
Myers, G. et al.; "Drill String Vibration: A Proxy For Identifying Lithologic Boundaries While Drilling, Proceeding of the Ocean Drilling Program Scientific Results" Proceedings of the Ocean Drilling Program, Scientific Results vol. 179 (pp. 1-17).
Nakanishi, Shoichi; "Feasibility study of Seismic-While Drilling using hammer drilling technology" Report No. GPM 4/99 Department of Exploration Geophysics, Nov. 1999 (pp. 1-120).
Non-Final Office Action issued in co-pending U.S. Appl. No. 13/553,958 (SA5001) dated Apr. 16, 2015; 25 pages.
Non-Final Office Action issued in co-pending U.S. Appl. No. 13/554,019 (SA761) dated Feb. 20, 2015; 62 pages.
Non-Final Office Action issued in co-pending U.S. Appl. No. 13/554,019 (SA761) dated Jul. 8, 2015 (42 pages).
Non-Final Office Action issued in co-pending U.S. Appl. No. 13/554,298 (SA759) dated Feb. 26, 2015 (41 pages).
Non-Final Office Action issued in co-pending U.S. Appl. No. 13/554,369 (SA797) dated Aug. 16, 2017; 14 pgs.
Non-Final Office Action issued in co-pending U.S. Appl. No. 13/554,470 (SA5002) dated Nov. 13, 2014 (22 pages).
Non-Final Office Action issued in co-pending U.S. Appl. No. 15/233,541 (SA5596) dated Sep. 22, 2017; 10 ?gs.
Notice of Allowance issued in co-pending U.S. Appl. No. 13/554,298 (SA759) dated Oct. 29, 2015; 14 pages.
Notice of Allowance issued in co-pending U.S. Appl. No. 13/554,470 (SA5002) dated Mar. 2, 2015; 15 pages.
Radtke et al., Advanced Seismic While Drilling System, Oil & Natural Gas Technology, Jun. 2008, 65 pages.
Schlumberger "Drillpipe" retrieved at http://www.glossary.oilfield.slb.com/en/Terms/d/drillpipe.aspx, 2013 (1 page).
Schlumberger "Drillstring" retrieved at http://www.glossary.oilfield.slb.com/en/Terms/d/drillstring.aspx, 2013 (1 page).
Sun, X.; "A Study of Acoustic Emission in Drilling Applications, American Rock Mechanics Association" The 37th U.S. Symposium on Rock Mechanics (USRMS), Jun. 7-9, 1999, paper No. 99-0983, Vail, CO. (1 page).
Vardhan, H. et al.; "Estimating Rock Properties Using Sound Levels Produced During Drilling" International Journal of Rock Mechanics & Mining Sciences, (2009), vol. 46, pp. 604-612.
Veeningen, D., Nov-IntelliServ, USA, Describes How Broadband Network Expands Possibilities For Drilling Extend Reach Multi-lateral Wells, Oilfield Technology, Jun. 2009, www.oilfieldtechnology.com (4 pages).
International Search Report and Written Opinion for International Application No. PCT/US2019/059884 (SA5963PCT) dated Apr. 30, 2020; pp. 1-14.

APPARATUS AND METHODS OF EVALUATING ROCK PROPERTIES WHILE DRILLING USING ACOUSTIC SENSORS INSTALLED IN THE DRILLING FLUID CIRCULATION SYSTEM OF A DRILLING RIG

RELATED APPLICATIONS

This application is a continuation of and claims priority to and the benefit of U.S. Non-Provisional patent application Ser. No. 16/183,037 titled "Apparatus and Method of Evaluating Rock Properties While Drilling Using Acoustic Sensors Installed in the Drilling Fluid Circulation System of Drilling Rig" filed on Nov. 7, 2018, which is a continuation-in-part of and claims priority to and the benefit of U.S. Non-Provisional patent application Ser. No. 13/554,369 titled "Methods Of Evaluating Rock Properties While Drilling Using Downhole Acoustic Sensors And A Downhole Broadband Transmitting System" filed on Jul. 20, 2012, which is a non-provisional of and claims priority to and the benefit of U.S. Provisional Patent Application No. 61/539,171, titled "Methods Of Evaluating Rock Properties While Drilling Using Downhole Acoustic Sensors And A Downhole Broadband Transmitting System," filed on Sep. 26, 2011, and is related to U.S. patent application Ser. No. 13/554,019, filed on Jul. 20, 2012, titled "Apparatus, Computer Readable Medium and Program Code for Evaluating Rock Properties While Drilling Using Downhole Acoustic Sensors and Telemetry System"; U.S. patent application Ser. No. 13/553,958, filed on Jul. 20, 2012, titled "Methods of Evaluating Rock Properties While Drilling Using Downhole Acoustic Sensors and Telemetry System"; U.S. patent application Ser. No. 13/554,298, filed on Jul. 20, 2012, titled "Apparatus for Evaluating Rock Properties While Drilling Using Drilling Rig-Mounted Acoustic Sensors"; and U.S. patent application Ser. No. 13/554,470, filed on Jul. 20, 2012, titled "Methods for Evaluating Rock Properties While Drilling Using Drilling Rig-Mounted Acoustic Sensors"; U.S. patent application Ser. No. 13/554,077, filed on Jul. 20, 2012, titled "Apparatus, Computer Readable Medium, and Program Code For Evaluating Rock Properties While Drilling Using Downhole Acoustic Sensors and a Downhole Broadband Transmitting System; U.S. Provisional Patent Application No. 61/539,165, titled "Apparatus And Program Product For Evaluating Rock Properties While Drilling Using Downhole Acoustic Sensors And A Downhole Broadband Transmitting System," filed on Sep. 26, 2011; U.S. Provisional Patent Application No. 61/539,201, titled "Apparatus For Evaluating Rock Properties While Drilling Using Drilling Rig-Mounted Acoustic Sensors," filed on Sep. 26, 2011; U.S. Provisional Patent Application No. 61/539,213, titled "Methods For Evaluating Rock Properties While Drilling Using Drilling Rig-Mounted Acoustic Sensors," filed on Sep. 26, 2011; U.S. Provisional Patent Application No. 61/539,242 titled "Apparatus And Program Product For Evaluating Rock Properties While Drilling Using Downhole Acoustic Sensors And Telemetry System," filed on Sep. 26, 2011; and U.S. Provisional Patent Application No. 61/539,246 titled "Methods Of Evaluating Rock Properties While Drilling Using Downhole Acoustic Sensors And Telemetry System," filed on Sep. 26, 2011, each incorporated herein by reference in its entirety for purposes of United States Patent Practice.

BACKGROUND OF THE INVENTION

Field of the Invention

This invention relates in general to hydrocarbon production, and more particularly, to identifying rock types and rock properties in order to improve or enhance drilling operations.

Description of the Related Art

Measuring rock properties during drilling in real time can provide the operator the ability to steer a drill bit in the direction of desired hydrocarbon concentrations. In current industrial practice and prior inventions, either resistivity or sonic logging while drilling (LWD) tools are employed to guide the drill bit during horizontal or lateral drilling. The center of these techniques is to calculate the locations of the boundary between the pay zone and the overlying rock (upper boundary), and the boundary between the pay zone and underlying rock (lower boundary) at the sensors location. The drill bit is steered or maintained within the pay zone by keeping the drill string, at the sensors position, in the middle, or certain position between the upper and lower boundaries of the pay zone. The conventional borehole acoustic telemetry system, which transmits data at low rate (at about tens bit per second), is employed to transmit the measured data to surface.

Since the sensors are located 30-50 feet behind the drill bit, theses conventional LWD steering tools only provide data used in steering the drill bit 30-50 feet behind the drill bit. As the result, it is only after the 30-50 feet that the operator finds out if the selected drilling path is or is not the desired one. Therefore, these tools are not true real-time tools.

Some newer types of systems attempt to provide data at the drill bit, at-real-time, while still utilizing conventional borehole telemetry systems (having a relatively slow bit rate). Such systems, for example, are described as including a downhole processor configured to provide downhole on-site processing of acoustic data to interpret the lithologic properties of the rock encountered by the drill bit through comparison of the acoustic energy generated by the drill bit during drilling with predetermined bit characteristics generated by rotating the drill bit in contact with a known rock type. The lithologic properties interpreted via the comparison are then transmitted to the surface via the conventional borehole telemetry system. Although providing data in a reduced form requiring only a bit rate speed, as such systems do not provide raw data real-time which can be used for further analysis, it is nearly impossible to construct additional interpretation models or modify any interpretation models generated by the downhole processor.

Some newer types of borehole data transmitting systems utilize a dedicated electronics unit and a segmented broadband cable protected by a reinforced steel cable positioned within the drill pipe to provide a much faster communication capability. Such systems have been employed into conventional LWD tools to enhance the resolution of the logged information. However the modified tools still measures rock properties at the similar location which is 30-50 feet behind the drill bit.

Accordingly, recognized by the inventor is the need for apparatus, computer readable medium, program code, and methods of identifying rock properties in real-time during drilling, and more particularly, methods which include positioning acoustic sensors adjacent the drill bit to detect drill sounds during drilling operations, pushing raw acoustic sensor data to a surface computer over a broadband transmitting system, receiving the raw acoustic sensor data, and deriving the rock type and/or evaluating the properties of the rocks in real-time utilizing the raw acoustic sensor data. Additionally, recognized by the inventor is the need for apparatus, computer readable media, program code, and methods of identifying rock properties in real-time during drilling and, more particularly, apparatus and methods which include acoustic sensors located in a drilling fluid circulation system of a drilling rig to detect an acoustic signal generated real-time as a result of rotational contact of a drill bit with rock during drilling and transmitted through the drilling fluid (for example, drilling mud) circulation system. The apparatus and method include a data acquisition unit to sample the raw acoustic sensor data, and a computer to determine the lithology type of rock or evaluate the petrophysical properties of the rocks in real-time utilizing the raw acoustic sensor data.

SUMMARY OF THE INVENTION

In view of the foregoing, various embodiments of the present invention advantageously provide apparatus, computer readable medium, program code, and methods of identifying rock types and rock properties of rock that is currently in contact with an operationally employed drilling bit, which can be used in real-time steering of the drilling bit during drilling. Various embodiments of the present invention provide apparatus and methods which include acoustic sensors located in a drilling fluid circulation system of a drilling rig to detect an acoustic signal generated real-time as a result of rotational contact of a drill bit with rock during drilling and transmitted through the drilling fluid. The apparatus and method include a data acquisition unit for to sample the raw acoustic sensor data, and a computer to identify the lithology type of rock or evaluate the petrophysical properties of the rocks in real-time utilizing the raw acoustic sensor data. One or more acoustic sensors may be coupled to the bell nipple, gooseneck, standpipe, other components, or any combination thereof of the drilling fluid circulation system.

According to various embodiments of the present invention, a surface computer/processor receives the raw acoustic sensor data from acoustic sensors. Utilizing the raw acoustic sensor data, the computer can advantageously function to derive a frequency distribution of the acoustic sensor data, derive acoustic characteristics from the raw acoustic data, and determine petrophysical properties of rock from the raw acoustic sensor data. The acoustic characteristics can advantageously further be used to identify the lithology type of the rock encountered by the drill bit, to determine the formation boundary, to determine an optimal location of the casing shoe, among other applications. According to various embodiments of the present invention, to determine petrophysical properties of the rock directly from the raw acoustic sensor data (generally after being converted into the frequency domain and filtered), a petrophysical properties evaluation algorithm can be derived from acoustic sensor data and correspondent petrophysical properties of formation samples.

Various embodiments of a method of identifying rock properties of rock in real-time during operational drilling, to include identifying lithology type and other petrophysical properties, can include the deployment, installation, and/or positioning of both conventional components and additional/enhanced acoustic components. Some primary conventional components include a drill string containing a plurality of drill pipes each having an inner bore, a drill bit connected to the downhole end of the drill string, and a top drive system for rotating the drill string having both rotating and stationary portion. The additional/acoustic components can include a downhole sensor subassembly connected to and between the drill bit and the drill string, acoustic sensors (e.g. accelerometer, measurement microphone, contact microphone, hydrophone) attached to or contained within the downhole sensor subassembly adjacent the drill bit and positioned to detect drill sounds during drilling operations. The additional components can also include a broadband transmitting system operably extending through the inner bore of each of the plurality of drill pipes and operably coupled to the acoustic sensors through the downhole data transmitting interface position therewith, a surface data transmitting interface typically connected to a stationary portion of the top drive system, a surface data acquisition unit connected to the surface data transmitting interface, and a surface computer operably coupled to the downhole data transmitting interface through the data acquisition unit, the surface data transmitting interface, and the broadband transmitting system.

Various embodiments of the method can also include both computer employable steps (operations), as described later with respect to the operations performed by various featured apparatus/program code, and various non-computer implemented steps which provide substitutable replacements for the featured computer implemented steps, in conjunction with additional non-computer implemented steps as described below and/or as featured in the appended claims. Examples of various embodiments of the method are described below.

According to an embodiment of a method of analyzing properties of rock in a formation in real-time during drilling, the method can include the steps of sending sampling commands to the data acquisition unit and receiving raw acoustic sensor data from a surface data interface in communication with a communication medium further in communication with a downhole data interface operably coupled to a plurality of acoustic sensors. The method can also include various processing steps which include deriving a frequency distribution of the raw acoustic sensor data, deriving a plurality of acoustic characteristics including mean frequency and normalized deviation of frequency from the raw acoustic sensor data utilizing, for example, an acoustics characteristics evaluation algorithm, and/or deriving petrophysical properties from the raw acoustic sensor data utilizing, for example, a petrophysical properties evaluation algorithm employable to predict one or more petrophysical properties of rock undergoing drilling.

According to an embodiment of the method, the step of deriving a frequency distribution of the acoustic data from the raw acoustic sensor data includes transforming the raw acoustic sensor data into the frequency domain (e.g., employing a Fast Fourier Transform (FFT)), and filtering the transformed data.

According to an embodiment of the method, the step of deriving the plurality of acoustic characteristics from the raw acoustic sensor data can include providing the acoustic characteristics evaluation algorithm and comparing the mean frequency, the normalized deviation of frequency, the mean amplitude, the normalized deviation of amplitude, and apparent power for the rock undergoing drilling with the mean frequency, normalized deviation of frequency, mean amplitude, normalized deviation of amplitude, and apparent power for a plurality of rock samples having different known lithologies according to a first configuration, or comparing only part of the acoustic characteristics, such as the mean frequency and the normalized deviation of frequency of the rock undergoing drilling with the same type of acoustic characteristics of a plurality of rock samples having different known lithologies according to another configuration. The method can also include identifying lithology type of the rock undergoing drilling, determining a location of a formation boundary encountered during drilling, and/or identifying an ideal location for casing shoe positioning, among others.

According to an exemplary implementation, the mean frequency and normalized deviation of frequency are examined together to determine an amount of correlation of the acoustic characteristics associated with the rock undergoing drilling and the acoustic characteristics associated with the rock samples. Also or alternatively, the mean frequency and the mean amplitude can be examined together and/or with normalized deviation of frequency and/or normalized deviation of amplitude and apparent power, or a combination thereof. The step of comparing can beneficially be performed substantially continuously during drill bit steering in order to provide enhanced steering ability.

According to an embodiment of the method, the step of deriving petrophysical properties from the raw sensor data can include deriving a bit-specific petrophysical properties evaluation algorithm for use in evaluating the received signals. The derivation of the algorithm can include collecting petrophysical properties data describing one or more petrophysical properties of rock for a plurality of formation samples and correspondent acoustic data for a preselected type of drill bit and processing the collected acoustic data to produce filtered FFT data. The algorithm derivation can also include determining one or more relationships between features of the filtered FFT data and correspondent one or more petrophysical properties of rock describing petrophysical properties of a plurality of formation samples, e.g., utilizing mathematical modeling techniques such as, multiple regression analysis, artificial neural network modeling, etc. The algorithm derivation can also include coding the determined relationships into computer program code defining the bit-specific petrophysical properties evaluation algorithm. The derived algorithm can then be used in predicting one or more petrophysical properties of the rock undergoing drilling real-time responsive to filtered data associated with raw acoustic sensor data produced in response to the drilling.

According to another embodiment of the method, the step of deriving petrophysical properties from the raw sensor data can also or alternatively include deriving a bit-independent petrophysical properties evaluation algorithm. The derivation of the algorithm can include collecting petrophysical properties data describing one or more petrophysical properties of rock for a plurality of formation samples and correspondent acoustic data for a plurality of different types of drill bits, processing the collected acoustic data to produce filtered FFT data, and determining bit-type independent features of the filtered FFT data. The algorithm derivation can also include determining one or more relationships between the bit-type independent features of the filtered FFT data and correspondent one or more petrophysical properties of the rock, e.g., using mathematical modeling techniques, such as artificial neural network modeling, etc., to provide a bit-independent evaluation methodology. The algorithm derivation can also include coding the determined relationships into computer program code defining the bit-independent petrophysical evaluation properties algorithm. Correspondingly, the method can include employing the derived petrophysical properties evaluation algorithm to predict one or more petrophysical properties of the rock undergoing drilling real-time responsive to filtered data associated with raw acoustic sensor data produced in response to the drilling.

According to various embodiments of the present invention, apparatus for analyzing properties of rock in a formation in real-time during drilling are also provided. An example of an embodiment of such an apparatus can include a drill string containing a plurality of drill pipes each having an inner bore, a drill bit connected to the downhole end of the drill string, and a top drive system for rotating the drill string having both rotating and stationary portion. The apparatus can also include a downhole sensor subassembly connected to a rotating portion of the system, such as, for example, to and between the drill bit and the drill string, acoustic sensors (e.g. accelerometer, measurement microphone, contact microphone, hydrophone) attached to or contained within the downhole sensor subassembly adjacent the drill bit and positioned to detect drill sounds during drilling operations. The apparatus can further include a broadband transmitting system operably extending through the inner bore of each of the plurality of drill pipes and operably coupled to the acoustic sensors through the downhole data transmitting interface position therewith, a surface data transmitting interface typically connected to a stationary portion of the top drive system, a data acquisition unit in communication with the surface data transmitting interface, and a surface computer operably coupled to the downhole data transmitting interface through surface acquisition unit, the surface data transmitting interface, and the broadband transmitting system.

According to an embodiment of the apparatus, the computer includes a processor, memory in communication with the processor, and petrophysical properties analyzing program, which can adapt the computer to perform various operations. The operations can include, for example, sending sampling commands to the data acquisition unit, receiving raw acoustic data from the downhole data transmitting interface, processing the received raw acoustic sensor data—deriving a frequency distribution of the acoustic data from the raw acoustic data, employing an acoustics characteristics evaluation algorithm to thereby derive acoustic characteristics from the raw acoustic sensor data (e.g., via analysis of the processed acoustics data), and employing a petrophysical properties evaluation algorithm to thereby derive petrophysical properties of rock undergoing drilling, real-time, from the acoustics data.

According to an embodiment of the apparatus, the acoustic characteristics evaluation algorithm evaluates filtered Fast Fourier Transform data for acoustic characteristics. The acoustic characteristics can include mean frequency, normalized deviation of frequency, mean amplitude, normalized deviation of amplitude, and apparent power. These characteristics can be predetermined for rock samples having a known lithology type and/or petrophysical properties, and thus, can be used to identify lithology type and other properties by comparing such characteristics of the acoustic data received during drilling to that determined for the rock samples. According to another embodiment of the apparatus, the computer uses the derived acoustic characteristics to determine formation boundaries based on real-time detection of changes in the lithology type of the rock being drilled and/or petrophysical properties thereof.

According to an exemplary configuration, the petrophysical properties analyzing program or separate program code functions derive a "bit specific" or "bit independent" petrophysical properties evaluation algorithm. Similarly, the derived bit specific or bit independent petrophysical properties evaluation algorithm evaluates filtered Fast Fourier Transform data for petrophysical properties. This petrophysical property data can advantageously be applied by other applications to include real-time formation boundary determination, casing shoe position fine-tuning, geosteering, etc.

According to an embodiment of the present invention, the petrophysical properties analyzing program can be provided either as part of the apparatus or as a standalone deliverable. As such, the petrophysical properties analyzing program can include a set of instructions, stored or otherwise embodied on a non-transitory computer readable medium, that when executed by a computer, cause the computer to perform various operations. These operations can include the operation of receiving raw acoustic sensor data from a surface data interface in communication with a communication medium that is further in communication with a downhole data interface operably coupled to a plurality of acoustic sensors. The operations can also include the processing operations of deriving a frequency distribution of the raw acoustic sensor data, deriving a plurality of acoustic characteristics including mean frequency and normalized deviation of frequency from the raw acoustic sensor data, and/or deriving petrophysical properties from the raw acoustic sensor data utilizing a derived petrophysical properties evaluation algorithm employable to predict one or more petrophysical properties of rock undergoing drilling.

According to an embodiment of the petrophysical properties analyzing program, the operation of deriving a frequency distribution of the acoustic data from the raw acoustic sensor data includes transforming the raw acoustic sensor data into the frequency domain (e.g., employing a Fast Fourier Transform), and filtering the transformed data.

According to an embodiment of the petrophysical properties analyzing program, the operation of deriving the plurality of acoustic characteristics from the raw acoustic sensor data can include comparing the mean frequency, the normalized deviation of frequency, the mean amplitude, the normalized deviation of amplitude, and apparent power for the rock undergoing drilling with the mean frequency, normalized deviation of frequency, mean amplitude, normalized deviation of amplitude, and apparent power for a plurality of rock samples having different known lithologies according to a first configuration, or comparing only part of the acoustic characteristics, such as the mean frequency and the normalized deviation of frequency of the rock undergoing drilling with the same type of acoustic characteristics of a plurality of rock samples having different known lithologies according to another configuration. The operations can also include identifying lithology type of the rock undergoing drilling, determining a location of a formation boundary encountered during drilling, and/or identifying an ideal location for casing shoe positioning, among others.

According to an exemplary implementation, the mean frequency and normalized deviation of frequency are examined together to determine an amount of correlation of the acoustic characteristics associated with the rock undergoing drilling and the acoustic characteristics associated with the rock samples. Also or alternatively, the mean frequency and the mean amplitude can be examined together and/or with the normalized deviation of frequency or apparent power, or a combination thereof. The operation of comparing can beneficially be performed substantially continuously during drill bit steering in order to provide enhanced steering ability.

According to an embodiment of the petrophysical properties analyzing program employing a bit-specific evaluation methodology, the operation of deriving petrophysical properties from the raw acoustic sensor data can include deriving a bit-specific petrophysical properties evaluation algorithm. The derivation of the algorithm can include collecting petrophysical properties data describing one or more petrophysical properties of rock for a plurality of formation samples and correspondent acoustic data for a preselected type of drill bit, processing the collected acoustic data to produce filtered FFT data, and determining one or more relationships between features of the filtered FFT data and correspondent one or more petrophysical properties of rock describing petrophysical properties of the plurality of formation samples. This can be accomplished, for example, by utilizing mathematical modeling techniques such as, multiple regression analysis, artificial neural network modeling, etc. The derivation of the algorithm can also include coding the determined relationships into computer program code defining the petrophysical properties evaluation algorithm. The operations can correspondingly include employing the derived petrophysical properties evaluation algorithm to predict one or more petrophysical properties of the rock undergoing drilling real-time responsive to filtered data associated with raw acoustic sensor data produced in response to the drilling.

According to an embodiment of the petrophysical properties analyzing program employing a bit-independent evaluation methodology, the petrophysical properties evaluation algorithm derivation can also or alternatively include collecting petrophysical properties data describing one or more petrophysical properties of rock for a plurality of formation samples and correspondent acoustic data for a plurality of different types of drill bits, processing the collected acoustic data to produce filtered FFT data, determining bit-type independent features of the filtered FFT data, and determining one or more relationships between the bit-type independent features of the filtered FFT data and correspondent one or more petrophysical properties of the rock to provide a bit-independent evaluation methodology. The algorithm derivation can also include coding the determined relationships into computer program code defining a bit-independent petrophysical properties evaluation algorithm. The operations can correspondingly include employing the derived bit-independent petrophysical properties evaluation algorithm to predict one or more petrophysical properties of the rock undergoing drilling real-time responsive to filtered data associated with raw acoustic sensor data produced in response to the drilling.

According to another embodiment, an apparatus for determining properties of rock in a formation in real-time during drilling includes an acoustic sensor installed in a drilling fluid circulation system of a drilling rig and coupled to one of the following: (i) a bell nipple, (ii) a gooseneck, or (iii) a standpipe. The acoustic sensor is operable to detect an acoustic signal generated real-time as a result of rotational contact of a drill bit with rock during drilling and transmitted through the drilling fluid. The apparatus includes a data acquisition unit in communication with the acoustic sensor and a computer. The data acquisition unit is operable to sample the raw acoustic sensor data and digitize the raw acoustic sensor data. The computer is in communication with the acoustic sensor and configured to perform the operations that include receiving digitized acoustic sensor data from the data acquisition unit, the raw acoustic sensor data representing the acoustic signal generated real-time as a result of rotational contact of a drill bit with rock during drilling, and processing the digitized acoustic sensor data received from the acoustic sensor. The processing includes deriving a plurality of acoustic characteristics from the digitized acoustic sensor data, the plurality of acoustic characteristics including mean frequency and normalized deviation of frequency and comparing the mean frequency and the normalized deviation of frequency for the rock undergoing drilling with mean frequency and normalized deviation of frequency for a plurality of rock samples having different known lithologies. The computer is configured to perform operations that further include identifying a lithology type of the rock undergoing drilling responsive to the comparing. In some embodiments, the plurality of acoustic characteristics further include mean amplitude, normalized deviation of amplitude, and apparent power, and the operations include comparing the mean frequency, the normalized deviation of frequency, the mean amplitude, and the normalized deviation of amplitude, and the apparent power for the rock undergoing drilling with mean frequency, normalized deviation of frequency, mean amplitude, normalized deviation of amplitude, and apparent power for a plurality of rock samples having different known lithologies. In some embodiments, the processing includes sending sampling commands to the data acquisition unit in communication with the one or more acoustic sensors, converting analog acoustic signals into digitized data through employment of the data acquisition unit, transforming the digitized data into Fast Fourier Transform data using a Fast Fourier transformation, filtering the Fast Fourier Transform data, restoring the Fast Fourier Transform data to compensate for attenuation by the drilling fluid, and deriving the plurality of acoustic characteristics from the filtered and restored Fast Fourier Transform data. In some embodiments, the apparatus includes an amplifier connected to the acoustic sensor, the amplifier is operable to amplify the raw acoustic sensor data before received by the data acquisition unit. In some embodiments, the acoustic sensor includes a first acoustic sensor installed in coupled to the bell nipple of the drilling fluid circulation system. In some embodiments, the acoustic sensor includes a second acoustic sensor coupled to the gooseneck of the drilling fluid circulation system. In some embodiments, the acoustic sensor includes a third acoustic sensor coupled to the standpipe of the drilling fluid circulation system.

According to another embodiment, an apparatus for determining properties of rock in a formation in real-time during drilling includes an acoustic sensor installed in a drilling fluid circulation system of a drilling rig and coupled to one of the following: (i) a bell nipple, (ii) a gooseneck, or (iii) a standpipe. The acoustic sensor is operable to detect an acoustic signal generated real-time as a result of rotational contact of a drill bit with rock during drilling and transmitted through the drilling fluid. The apparatus includes a data acquisition unit in communication with the acoustic sensor and a computer. The data acquisition unit is operable to sample the raw acoustic sensor data and digitize the raw acoustic sensor data. The computer is in communication with the acoustic sensor and configured to perform the operations that include receiving digitized acoustic sensor data from the data acquisition unit, the raw acoustic sensor data representing the acoustic signal generated real-time as a result of rotational contact of a drill bit with rock during drilling, and processing the raw acoustic sensor data received from the acoustic sensor. The processing includes transforming the digitized data into Fast Fourier Transform (FFT) data using a Fast Fourier transformation, filtering the FFT data, restoring the FFT data to compensate for attenuation by the drilling fluid, and determining petrophysical properties of rock being encountered by the drill bit using a petrophysical properties evaluation algorithm employable to predict one or more petrophysical properties a rock undergoing drilling using the filtered and restored FFT data. In some embodiments, the apparatus includes an amplifier connected to the acoustic sensor, such that the amplifier is operable to amplify the raw acoustic sensor data before received by the data acquisition unit. In some embodiments, the processing includes sending sampling commands to the data acquisition unit in communication with the one or more acoustic sensors and converting analog acoustic signals into digitized data through employment of the data acquisition unit. In some embodiments, the one or more petrophysical properties include: lithology type, porosity, water saturation, and permeability of rock undergoing drilling. In some embodiments, the petrophysical properties evaluation algorithm is a bit-specific petrophysical properties evaluation algorithm and the processing includes collecting petrophysical properties data describing one or more petrophysical properties of rock contained in a data set and correspondent acoustic data for a preselected type of drill bit, processing the collected acoustic data to produce filtered and restored FFT data, determining one or more relationships between features of the filtered and restored FFT data and correspondent one or more petrophysical properties of rock for each type of drill bit, and coding the determined relationships into computer program code defining the petrophysical properties algorithm. In some embodiments, the petrophysical properties evaluation algorithm is a bit-independent petrophysical properties evaluation algorithm and the processing includes collecting petrophysical properties data describing one or more petrophysical properties of rock and correspondent acoustic data for a plurality of different types of drill bits, processing the collected acoustic data to produce filtered and restored FFT data, determining bit-type independent features of the filtered and restored FFT data, determining one or more relationships between the bit-type independent features of the filtered and restored FFT data and correspondent one or more petrophysical properties of the rock, and coding the determined relationships into computer program code defining the petrophysical properties algorithm. In some embodiments, the acoustic sensor includes a first acoustic sensor coupled to the bell nipple of the drilling fluid circulation system. In some embodiments, the acoustic sensor includes a second acoustic sensor coupled to the gooseneck of the drilling fluid circulation system. In some embodiments, the acoustic sensor includes a third acoustic sensor coupled to the standpipe of the drilling fluid circulation system.

According to another embodiment, a method for determining properties of rock in a formation in real-time during drilling using a drilling fluid includes detecting, by an acoustic sensor, an acoustic signal generated real-time as a result of rotational contact of a drill bit with rock during drilling and transmitted through the drilling fluid, the acoustic sensor installed in a drilling fluid circulation system of a drilling rig and coupled to one of the following: (i) a bell nipple, (ii) a gooseneck, or (iii) a standpipe. The method includes digitizing, by a data acquisition unit, the raw acoustic sensor data and processing, at a computer in communication with the data acquisition unit, the digitized acoustic sensor data received from the acoustic sensor. The processing includes deriving a plurality of acoustic characteristics from the digitized acoustic sensor data, the plurality of acoustic characteristics including mean frequency and normalized deviation of frequency and comparing the mean frequency and the normalized deviation of frequency for the rock undergoing drilling with mean frequency and normalized deviation of frequency for a plurality of rock samples having different known lithologies. The method also includes identifying a lithology type of the rock undergoing drilling responsive to the comparing. In some embodiments, the method includes sending sampling commands to the data acquisition unit in communication with the one or more acoustic sensors, converting analog acoustic signals into digitized data through employment of the data acquisition unit, transforming the digitized data into FFT data using a Fast Fourier transformation, filtering the FFT data, restoring the FFT data to compensate for attenuation by the drilling fluid, and deriving the plurality of acoustic characteristics from the filtered and restored FFT data. In some embodiments, the method includes amplifying the raw acoustic sensor data by an amplifier before being received by the data acquisition unit. In some embodiments, the plurality of acoustic characteristics further include mean amplitude, normalized deviation of amplitude, and apparent power and the method includes comparing the mean frequency, the normalized deviation of frequency, the mean amplitude, the normalized deviation of amplitude, and the apparent power for the rock undergoing drilling with mean frequency, normalized deviation of frequency, mean amplitude, normalized deviation of amplitude, and apparent power for a plurality of rock samples having different known lithologies. In some embodiments, the method includes determining a location of a formation boundary encountered during drilling responsive to the comparing. In some embodiments, the method includes determining an optimal location of a casing shoe for a casing associated with a drill string based on the location of the formation boundary. In some embodiments, the acoustic sensor includes a first acoustic sensor coupled to the bell nipple of the drilling fluid circulation system. In some embodiments, the acoustic sensor includes a second acoustic sensor coupled to the gooseneck of the drilling fluid circulation system. In some embodiments, the acoustic sensor includes a third acoustic sensor coupled to the standpipe of the drilling fluid circulation system.

According to another embodiment, a method for determining properties of rock in a formation in real-time during drilling using a drilling fluid includes detecting, by an acoustic sensor, an acoustic signal generated real-time as a result of rotational contact of a drill bit with rock during drilling and transmitted through the drilling fluid, the acoustic sensor installed in a drilling fluid circulation system of a drilling rig and coupled to one of the following: (i) a bell nipple, (ii) a gooseneck, or (iii) a standpipe. The method includes digitizing, by a data acquisition unit, the raw acoustic sensor data and processing, at a computer in communication with the data acquisition unit, the digitized acoustic sensor data received from the acoustic sensor. The processing includes transforming the digitized data into Fast Fourier Transform (FFT) data using a Fast Fourier transformation, filtering the FFT data, restoring the FFT data to compensate for attenuation by the drilling fluid, and determining petrophysical properties of rock being encountered by the drill bit using a petrophysical properties evaluation algorithm employable to predict one or more petrophysical properties of rock undergoing drilling using the filtered and restored FFT data. In some embodiments, the method includes amplifying the raw acoustic sensor data by an amplifier before the being received by the data acquisition unit. In some embodiments, the one or more petrophysical properties include: lithology type, porosity, water saturation, and permeability of rock undergoing drilling. In some embodiments, the petrophysical properties evaluation algorithm is a bit-specific petrophysical properties evaluation algorithm and the method includes collecting petrophysical properties data describing one or more petrophysical properties of rock contained in a data set and correspondent acoustic data for a preselected type of drill bit, processing the collected acoustic data to produce filtered and restored FFT data, determining one or more relationships between features of the filtered and restored FFT data and correspondent one or more petrophysical properties of rock for each type of drill bit, and coding the determined relationships into computer program code defining the petrophysical properties algorithm. In some embodiments, the petrophysical properties evaluation algorithm is a bit-independent petrophysical properties evaluation algorithm and the method includes collecting petrophysical properties data describing one or more petrophysical properties of rock and correspondent acoustic data for a plurality of different types of drill bits, processing the collected acoustic data to produce filtered and restored FFT data, determining bit-type independent features of the filtered and restored FFT data, determining one or more relationships between the bit-type independent features of the filtered and restored FFT data and correspondent one or more petrophysical properties of the rock, and coding the determined relationships into computer program code defining the petrophysical properties algorithm. In some embodiments, the method includes determining a location of a formation boundary encountered during drilling based on the determined petrophysical properties of the rock undergoing drilling. In some embodiments, the method includes determining an optimal location of a casing shoe for a casing associated with a drill string based on the location of the formation boundary. In some embodiments, the acoustic sensor includes a first acoustic sensor coupled to the bell nipple of the drilling fluid circulation system. In some embodiments, the acoustic sensor includes a second acoustic sensor coupled to the gooseneck of the drilling fluid circulation system. In some embodiments, the acoustic sensor includes a third acoustic sensor coupled to the standpipe of the drilling fluid circulation system.

Various embodiments of the present invention advantageously supply a new approach for a much better drilling steering. Various embodiments of the present invention provide apparatus and methods that supply detailed information about the rock that is currently in contact with the drilling bit, which can be used in real-time steering the drilling bit. That is, various embodiments of the present invention advantageously provide an employable methodology of retrieving a sufficient level of information so that the driller always knows the rock he is drilling, so that the drilling bit can be steered to follow the desire path more accurately than conventionally achievable. In comparison with conventional drilling steering tools, the real-time data provided by various embodiments of the present invention advantageously allow the driller to drill smoother lateral or horizontal wells with better contact with the production zone, to detect formation boundaries in real-time, and to detect the fractured zones in real-time, and to perform further analysis on raw sensor data, if necessary.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

Figure 1:
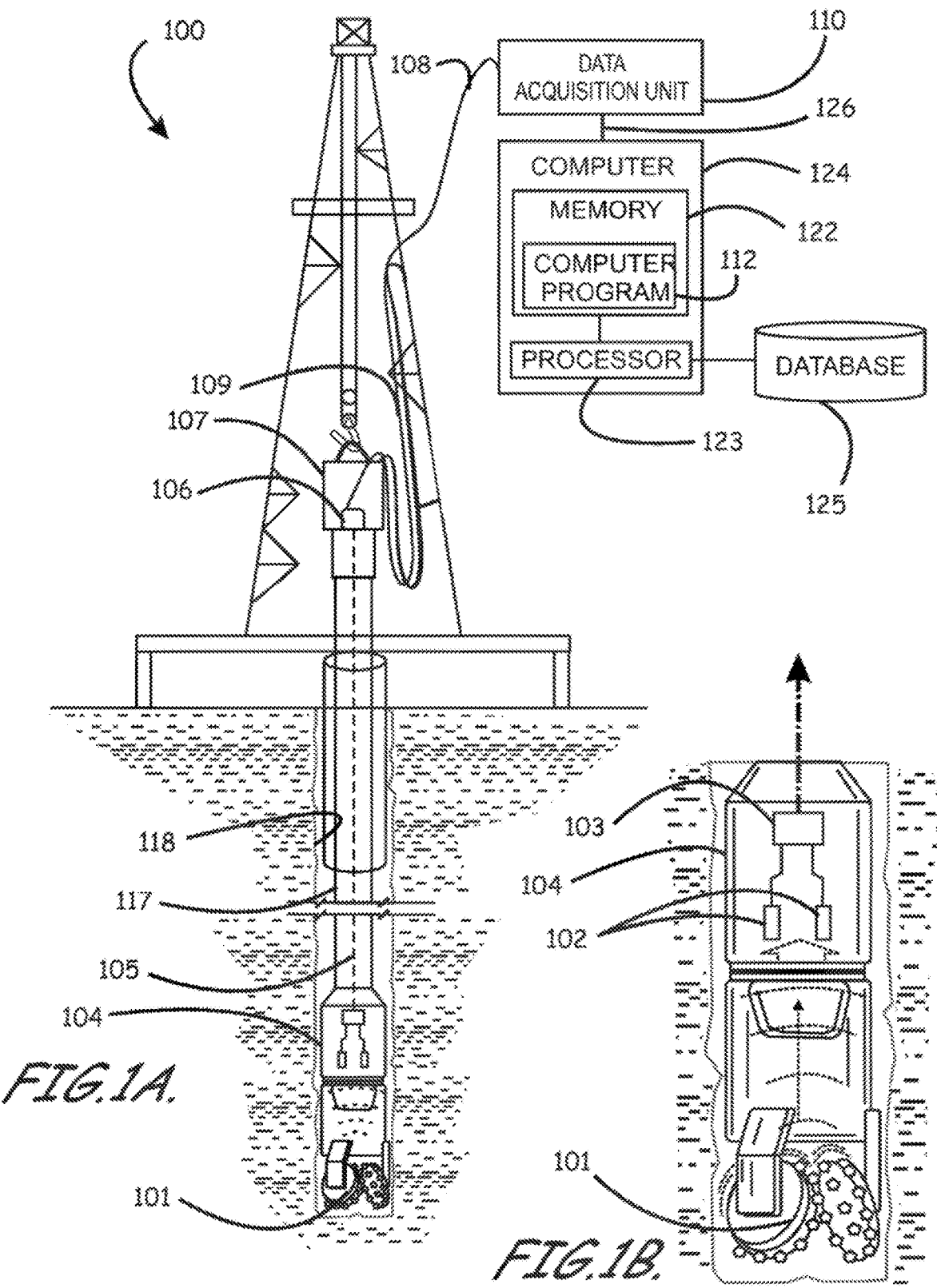
FIGS. 1A-1B is a partial perspective view and partial schematic diagram of a general architecture of an apparatus for identifying rock properties in real-time during drilling according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

When drilling into different lithologies or the same lithology with different properties (e.g., porosity, water saturation, permeability, etc.) the generated acoustic sounds emanating from the drill bit when drilling into rock, are distinctly different. The sounds, termed as drilling acoustic signals hereafter, transmit upward along the drill string. According to various embodiments of the present invention, a sensor subassembly containing acoustic sensors is positioned above the drill bit and connected to the above drill string. The drilling acoustic signals transmit from the drill bit to the sensor subassembly and are picked up by the acoustic sensors. The drilling acoustic signals received by the sensors are transmitted (generally after amplification) to surface by a borehole transmitting system which can include various components such as, for example, a downhole data interface, a broadband conductor, a surface data interface, etc. According to another embodiment of the present invention, acoustic sensors are positioned in the drilling fluid circulation system. The drilling acoustic signals transmit upwards in the drilling fluid circulation system from the drill bit to the sensors and are picked up by the acoustic sensors. The drilling acoustic signals received by the sensors are transmitted (generally after amplification) to a data acquisition unit (DAQ) connected with the acoustic sensors and then to a computer through a data transmitting system. On the surface, the received acoustic signals are transformed by a data processing module into the frequency domain using, for example, a Fast Fourier Transformation (FFT) to generate FFT data (primarily the frequency and amplitude data). Some acoustic characteristics are derived directly from the FFT data. The frequency distribution and acoustic characteristics, for example, can be used immediately in some applications, such as lithology type identification and formation boundary determination. The FFT data can be further analyzed using a calibrated mathematical model, for the lithology type and petrophysical properties, which have wider applications than the direct results (frequency distribution and acoustic characteristics).

Where conventional measurement-while-drilling tools are typically located 30 to 50 feet behind the drill bit, beneficially, a major advantage of approaches employed by various embodiments of the present invention is that such approaches can derive information about lithologies from a position located at the cutting surface of the drill bit or via acoustic signals transmitted through the drilling fluid to provide such information to the operator steering the drill bit, in real time. This advantage makes aspects of various embodiments of the present invention ideal in the application of horizontal and lateral well drill steering, locating the relative position for setting the casing shoe, detecting fractured zones, and interpreting rock lithologies and petrophysical properties in real time.

FIGS. 1A-1B schematically show the setup of an exemplary apparatus for identifying rock properties in real-time during drilling 100. Acoustic sensors 102 are connected to a downhole data "transmitting" interface 103. According to the exemplary configuration, both are contained in a sensor subassembly 104, which is positioned above a drill bit 101 and connected to a drill string 117. In operation, the drilling acoustic signals are generated when the drill bit 101 bites rocks at the bottom of a borehole 118 during the drilling process.

Different acoustic sensors 102 may be used, e.g. accelerometer, measurement microphone, contact microphone, and hydrophone. According to the exemplary configuration, at least one, but more typically each acoustic sensor 102 either has a built-in amplifier or is connected directly to an amplifier (not shown). The drilling acoustic signals picked up by the acoustic sensors 102 are amplified first by the amplifier before transmitted to the downhole data interface 103.

From the downhole data interface 103, acoustic signals are transmitted to a surface data "transmitting" interface 106 through a borehole broadband data transmitting system 105. Currently, one commercially available broadband data transmitting system, NOV™ IntelliServ®, can transmit data at the rate of 1000,000 bit/s. A study indicated that with two acoustic sensors 102 at normal working sampling rate of 5 seconds per sample, the required data transmitting rate was about 41,000 bits/s. Therefore, the NOV™ IntelliServg borehole broadband data transmitting system is an example of a broadband communication media capable of transmitting acoustic signals data for at least four acoustic sensors 102 to surface directly from a downhole data interface 103.

According to the exemplary configuration, the surface data interface 106 is located at the stationary part of the top drive 107. From the surface data interface 106, the acoustic signals are further transmitted to a data acquisition unit 110 through an electronic cable 108, which is protected inside a service loop 109. The data acquisition unit 110 is connected to a computer 124 through an electronic cable 126. The data acquisition unit 110 samples the acoustic signal in analog format and then converts the analog acoustic signals into digit data in FIG. 2.

Figure 2:
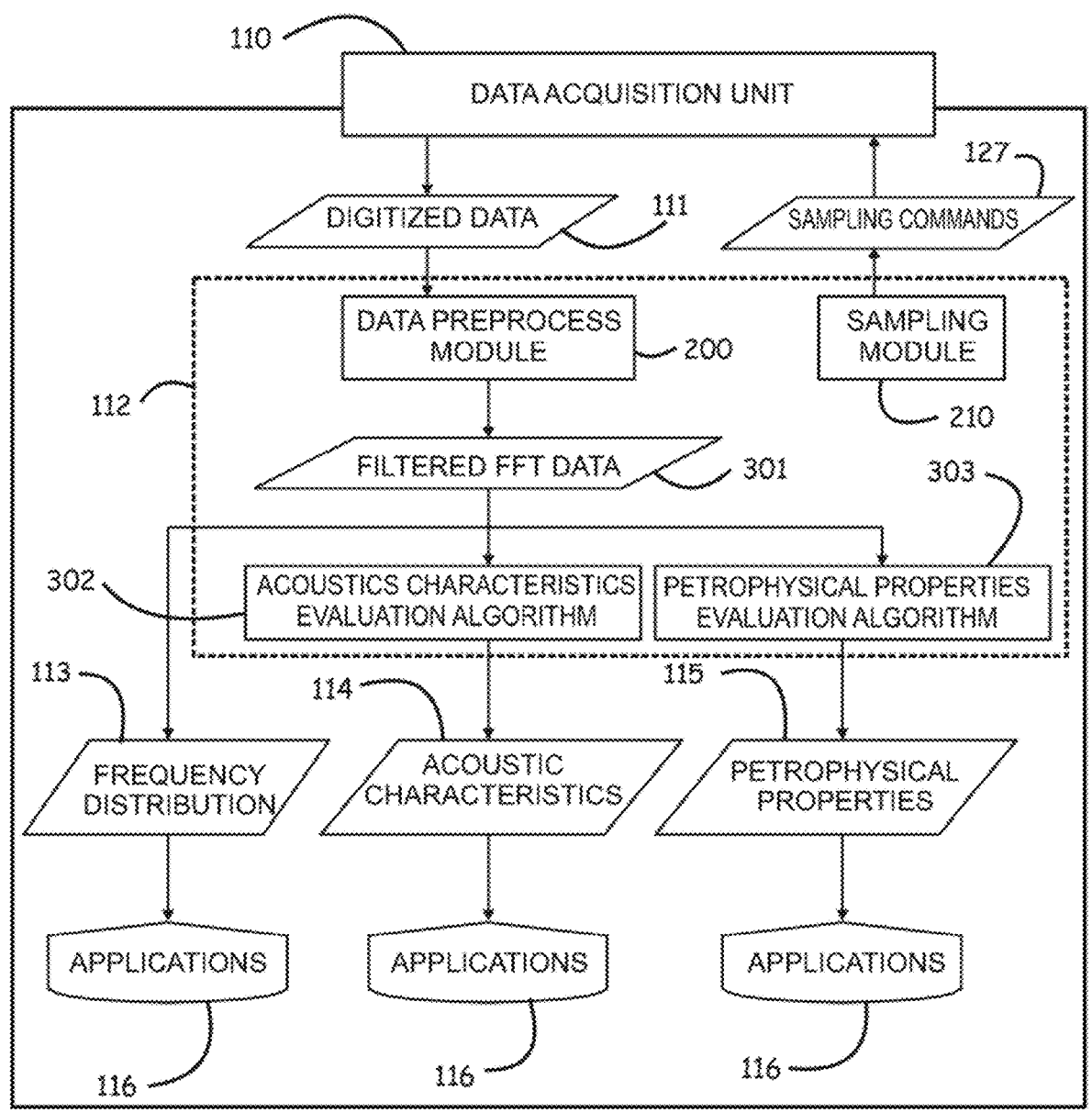
FIG. 2 is a schematic diagram showing a data processing procedure performed by a computer program according to an embodiment of the present invention.

Referring to FIGS. 1 and 2, the digitized data 111 is read by a computer program 112 (e.g., a petrophysical properties analyzing program), installed in memory 122 accessible to processor 123 of computer 124. The computer program 112 analyzes the digitized data 111 to derive a frequency distribution 113, acoustic characteristics 114, and petrophysical properties 115 of the rock undergoing drilling. The respective results, e.g., frequency distribution 113, acoustic characteristics 114, and petrophysical properties 115, can be used in various applications 116 to include lithology identification, drill bit steering, formation boundary identification, among others. Such data along with rock sample data, rock modeling data, etc. can be stored in database 125 stored in either internal memory 122 or an external memory accessible to processor 123.

Note, the computer 124 can be in the form of a personal computer or in the form of a server or server farm serving multiple user interfaces or other configurations known to those skilled in the art. Note, the computer program 112 can be in the form of microcode, programs, routines, and symbolic languages that provide a specific set or sets of ordered operations that control the functioning of the hardware and direct its operation, as known and understood by those skilled in the art. Note also, the computer program 112, according to an embodiment of the present invention, need not reside in its entirety in volatile memory, but can be selectively loaded, as necessary, according to various methodologies as known and understood by those skilled in the art. Still further, at least portions of the computer program 112 can be stored in memory of the sensor subassembly 104 when so configured.

Figure 3:
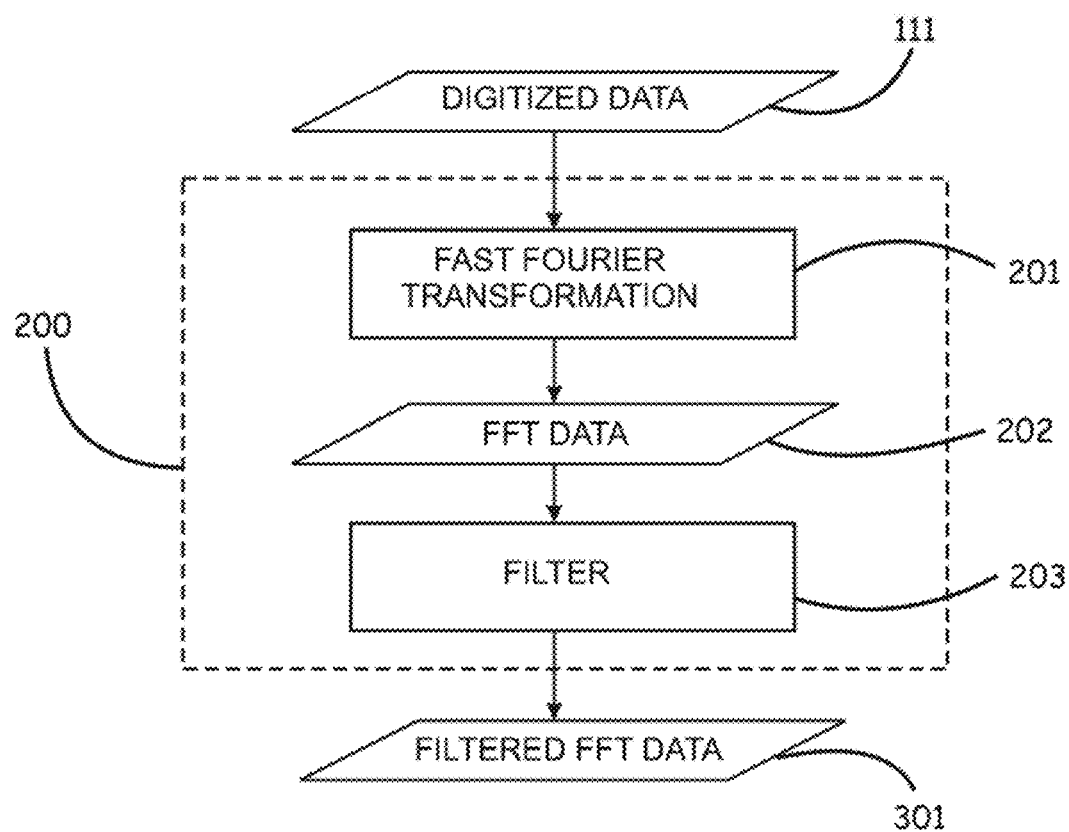
FIG. 3 is a schematic diagram illustrating major components of a data preprocess module according to an embodiment of the present invention.

Referring to FIG. 3, according to the exemplary configuration, the digitized data 111 needs to be preprocessed before any use. According to the exemplary configuration, this is accomplished by a subroutine program referred to as data preprocess module 200. As illustrated in the figure, the digitized data is transformed into Fast Fourier Transform (FFT) data 202 by a FFT 201. The FFT data 202 is then filtered by a filter 203 to remove some low/high frequency and/or low amplitude data points, generated from other sources, i.e. not from the bit cutting into the rocks. The filtered FFT data 301 is then used in the various part of data process. Note the filtered FFT data 301 is relabeled as 403 in FIGS. 7 and 503 in FIG. 8. Note also, the digitized data 111 is relabeled as 402 in FIG. 7, and 502 in FIG. 8.

Figure 4A:
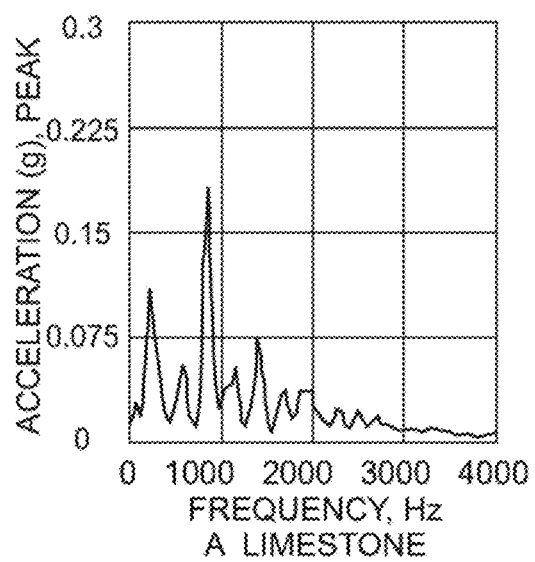
FIGS. 4A-4B are graphs illustrating examples of a frequency distribution of two types of carbonate according to an embodiment of the present invention.
Figure 4B:
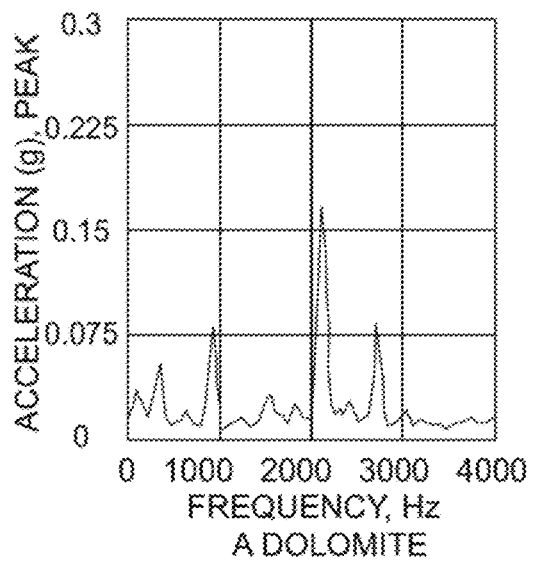

Major components and functions of the computer program 112 according to an exemplary configuration are detailed in FIG. 2. According to the exemplary configuration, there are four modules (components) in the computer program 112: a data preprocess module 200, a data sampling module 210, an acoustic characteristics evaluation algorithm 302, and a petrophysical properties evaluation algorithm 303. The sampling module 210 sends sampling commands 127, such as sampling rate, to the data acquisition unit 110 for data sampling control. The main part of the filtered FFT data 301 is a frequency distribution 113, which is the frequency and amplitude information of a sampled acoustic signal. Two examples of such signal are shown in FIGS. 4A and 4B. FIG. 4A illustrates the frequency distribution for a limestone and FIG. 4B illustrates the frequency distribution for a dolomite. A review of the frequency distribution of the two different types of carbonates illustrates how the frequency distribution can be used directly to distinguish lithologies.

According to the exemplary configuration, the frequency distribution 113 can be used directly in some applications, such as lithology type identification, formation boundaries determination, etc., represented by example at 116. The frequency distribution 113 can be plotted into depth-frequency spectrum which can be used directly in some applications, such as lithology type identification, formation boundaries determination, etc., represented by example at 116.

Figure 5:
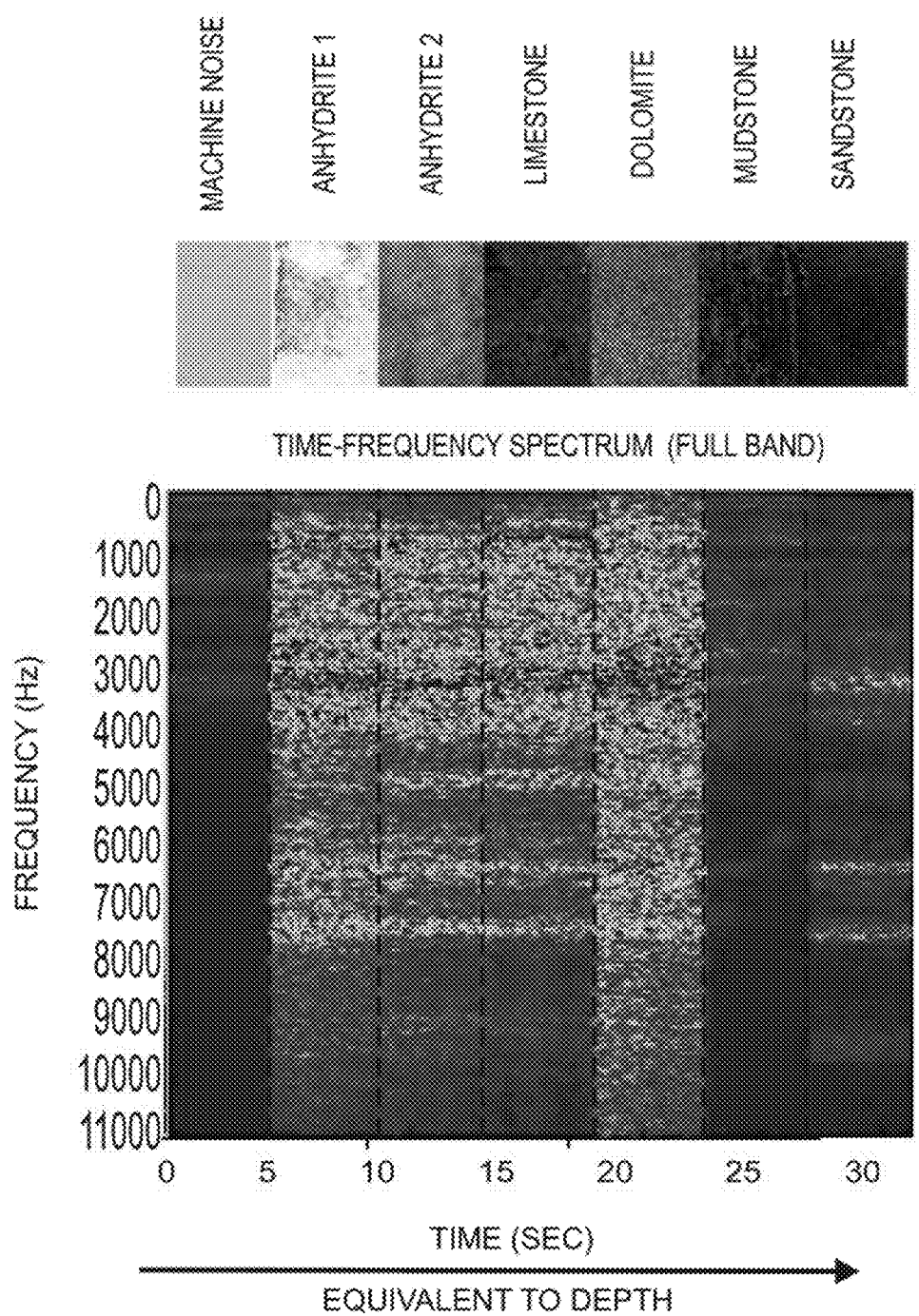
FIG. 5 is a graph illustrating a three dimensional depiction of the frequency distribution in correlation with various lithography types according to an embodiment of the present invention.

An example of such signal displaying diagram is shown in FIG. 5, which illustrates results of a laboratory experiment showing different lithologies have different frequency spectrums and lithology boundaries can be determined using the diagram. In FIG. 5, the color represents amplitude, with color normally displayed as red being highest (the intermixed color mostly concentrated just below the 4000 Hz range in this example) and the color normally displayed as blue being the lowest (the more washed out color in this example).

According to the exemplary configuration, an acoustic characteristics evaluation algorithm 302 evaluates the filtered FFT data 301 for select acoustic characteristics, such as, for example, mean frequency, normalized deviation of frequency, mean amplitude, normalized deviation of amplitude, and apparent power. These acoustic characteristics for an acoustic signal sample are defined as follows:

$$\mu_f = \frac{\sum_{i=1}^{n} A_i \cdot f_i}{\sum_{i=1}^{n} A_i} \quad (1)$$

$$\sigma_{f\_N} = \frac{1}{\mu_f} \sqrt{\sum_{i=1}^{n} \frac{A_i}{\sum_{i=1}^{n} A_i} (f_i - \mu_f)^2} \quad (2)$$

$$\mu_A = \frac{1}{n} \sum_{i=1}^{n} A_i \quad (3)$$

-continued $$\sigma_{A\_N} = \frac{1}{\mu_A}\sqrt{\frac{1}{n}\sum_{i=1}^{n}(A_i - \mu_A)^2} \quad (4)$$

$$P_a = \sum_{i=1}^{n} A_i^2 f_i^2 \quad (5)$$

wherein:

$\mu_f$—mean frequency, Hz, $\alpha_{f\_N}$—normalized deviation of frequency, Hz, $\mu_A$—mean amplitude, the unit depending on the type of acoustic sensor used in the measurement, $\sigma_{A\_N}$—normalized deviation of amplitude, the unit depending on the type of acoustic sensor used in the measurement, $P_a$—apparent power, the unit depending on the type of acoustic sensor used in the measurement, $f_i$—frequency of the $i^{th}$ point of the acoustic signal sample, Hz, $A_i$—amplitude of the $i^{th}$ point of the acoustic signal sample, the unit depending on the type of acoustic sensor used in the measurement, and n-number of data points of the acoustic signal sample.

The mean frequency and the normalized deviation of frequency characterize the frequency distribution, while the mean amplitude and the normalized deviation of amplitude characterize the loudness level of the drilling sound. Apparent power represents the power of the acoustic signals. In the evaluation, these characteristics can be calculated within the whole range or a partial range of the frequency of the acoustic samples. The range is selected to achieve the maximum difference of these characteristics among different lithologies.

Figure 6:
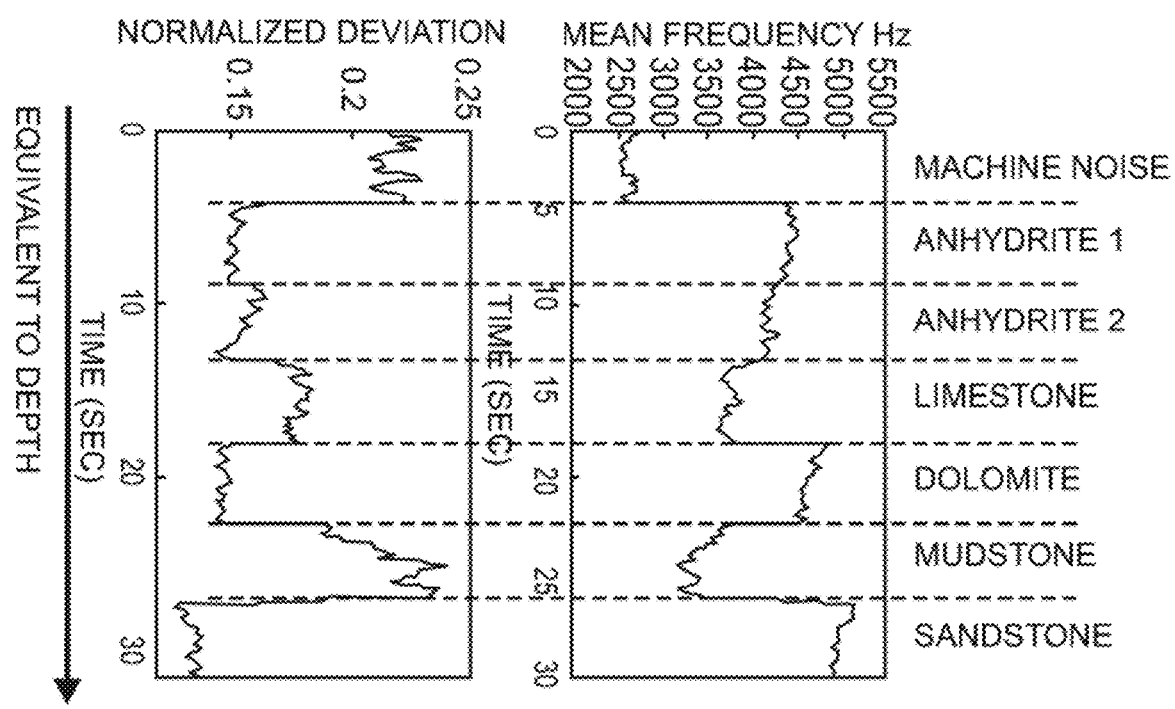
FIG. 6 is a graph illustrating a comparison of mean frequency and normalized deviation of frequency correlated with a plurality of lithology types according to an embodiment of the present invention.

The derived acoustic characteristics 114 can be used directly for certain applications, such as lithology type identification, formation boundary determination represented by example at 116. FIG. 6 illustrates results of a laboratory experiment showing that the mean frequency and normalized deviation of frequency correlated well with different lithology types.

According to an exemplary embodiment of the present invention, the mean frequency, the normalized deviation of frequency, the mean amplitude, the normalized deviation of amplitude, and/or the apparent power of the rock undergoing drilling can be compared with a corresponding mean frequency, normalized deviation of frequency, mean amplitude, normalized deviation of amplitude and/or apparent power of a plurality of rock samples having different known lithologies, to thereby determine an amount of correlation of the acoustic characteristics associated with the rock undergoing drilling and the acoustic characteristics associated with the rock samples. Responsively, the lithology type of the rock undergoing drilling can be determined.

Figure 7:
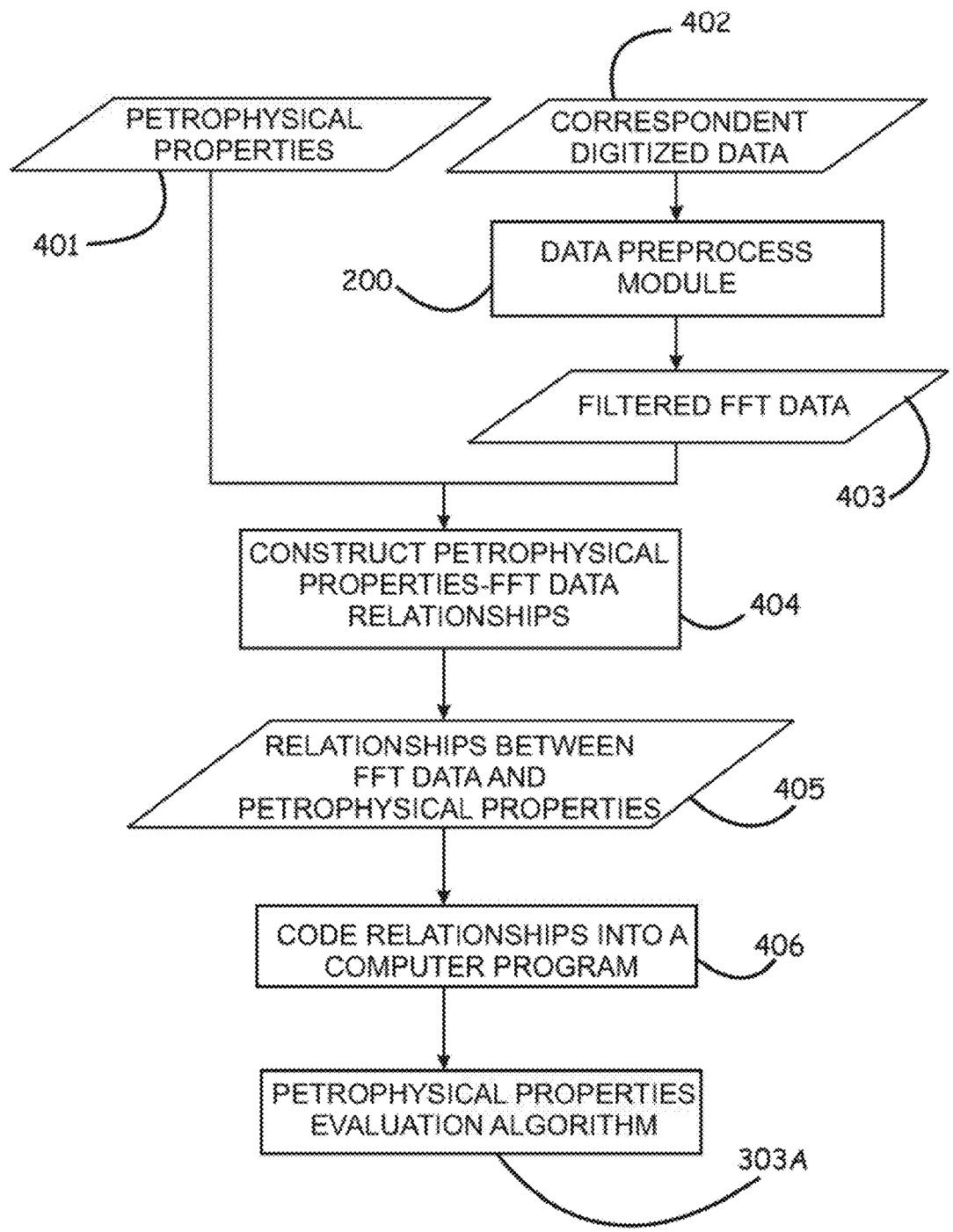
FIG. 7 is a schematic flow diagram illustrating steps for forming a petrophysical properties evaluation algorithm for a particular type of drill bit according to an embodiment of the present invention.
Figure 8:
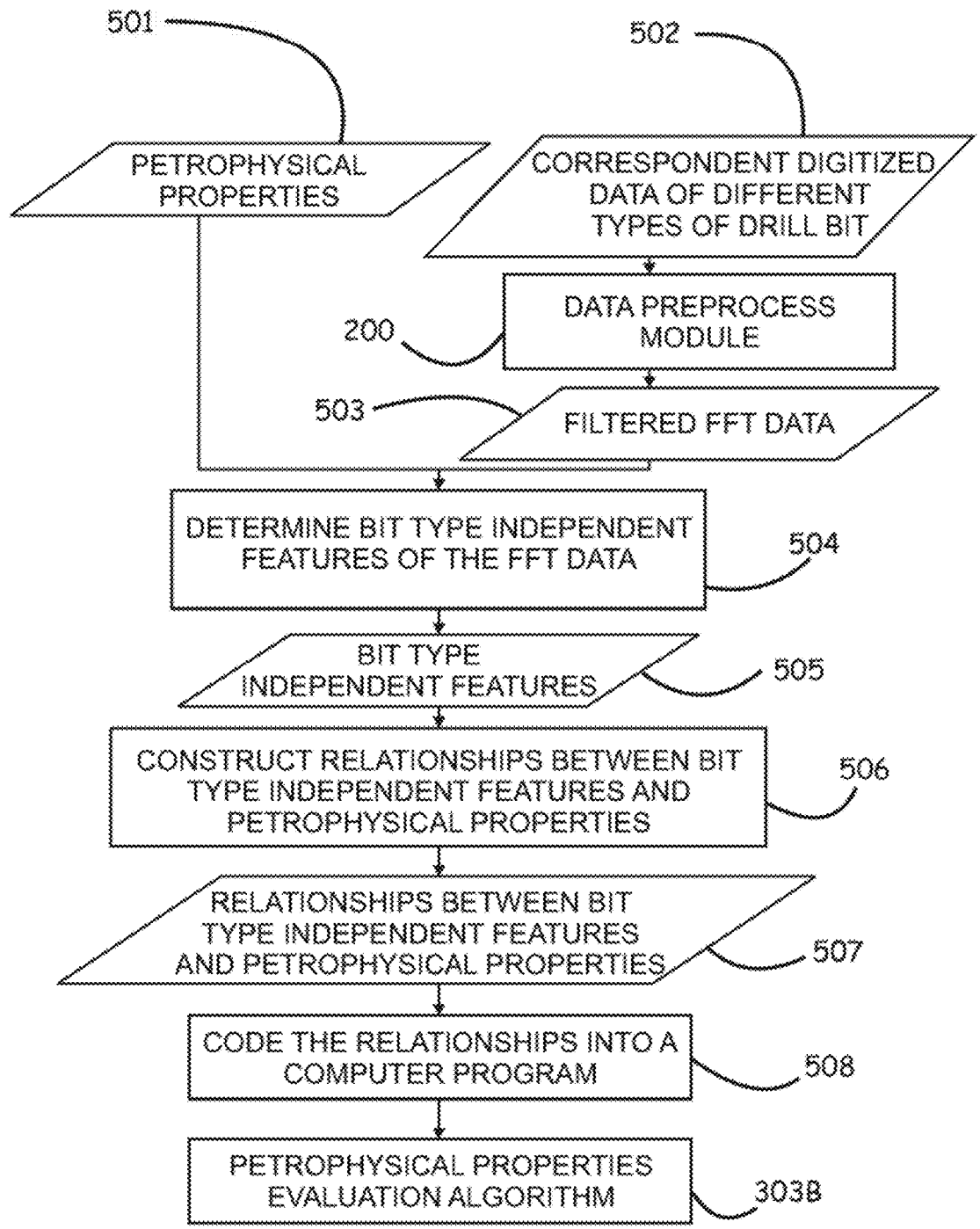
FIG. 8 is a schematic flow diagram illustrating steps for forming a drill bit independent petrophysical properties evaluation algorithm according to an embodiment of the present invention.

FIGS. 7 and 8 illustrate examples of the construction of two types of petrophysical properties evaluation algorithms 303: one designed for a particular type of drill bit shown at 303A and the other designed to be drill bit type independent shown at 303B. Unlike the FFT 201 and the acoustic characteristics evaluation algorithm 302, which are based on known mathematical equations, the petrophysical properties evaluation algorithm 303 is based on mathematical models, which are to be built utilizing acoustic data and petrophysical properties according to an exemplary configuration.

FIG. 7 illustrates the procedure for constructing a "Petrophysical Properties Evaluation Algorithm" for a particular type of drill bit. According to the exemplary configuration, datasets of petrophysical properties 401 and correspondent digitized acoustic data 402 for a particular drill bit are collected. The digitized acoustic data 402 is preprocessed by the data preprocess module 200 (referred to in FIG. 2) to produce the filtered FFT data 403. The relationships 405 between filtered FFT data 403 and petrophysical properties 401 are constructed (step 404) using suitable mathematical modeling techniques, such as, multiple regression analysis, artificial neural networks modeling. Once relationships 405 between the filtered FFT data 403 and petrophysical properties 401 are constructed, the relationships are coded (step 406) to produce a computer program, module, subroutine, object, or other type of instructions to define the "petrophysical properties evaluation algorithm" 303A. The algorithm 303A is then available to be used in the computer program 112 to predict the petrophysical properties from drilling acoustic signals for the particular drill bit type.

FIG. 8 illustrates the procedure for constructing a drill bit type independent "Petrophysical Properties Evaluation Algorithm" 303B. The datasets of petrophysical properties 501 and the correspondent acoustic data 502 measured from different types of drill bit are collected. The acoustic data 502 is preprocessed by the data preprocess module 200 (e.g., the module referred to FIGS. 2 and 3) to produce the filtered FFT data 503. Bit type independent features 505 of the filtered FFT data 503 are then determined by comparing the filtered FFT data of different types of drill bit and the correspondent petrophysical properties 501 (step 504). Features which have weakest correlation with the drill bit types and strong correlation with the petrophysical properties are the bit-type independent ones. The relationships 507 between the petrophysical properties 501 and the bit type independent features 505 are constructed (step 506) using suitable mathematical modeling techniques, such as, for example, multiple regression analysis, artificial neural networks modeling, among others. The constructed relationships 507 are then coded (step 508) into a computer program, module, subroutine, object, or other type of instructions to define the "petrophysical properties evaluation algorithm" 303B. The algorithm 303B is then available to be used in the computer program 112 to predict the petrophysical properties from drilling acoustic signals.

Application of the results from the processed acoustic signal.

One direct result is the frequency distribution 113 (FIG. 2), which may be used directly in lithology type identification, formation boundary determination. FIGS. 4A and 4B, for example, show the frequency distribution of two different types of carbonates. The figures illustrate that the frequency distribution can be used in the lithology type identification from matching a detective frequency distribution with a frequency distribution of a rock of known lithography type.

FIG. 6 demonstrates the feasibility of using acoustic characteristics 114 (FIG. 2) to derive lithology information. In FIG. 6, mean frequency and normalized deviation were calculated from FFT data of the drilling sounds of a sample corer drilling into cores of different lithologies. The figure demonstrates how the lithology types can be distinguished by the combination of the two characteristics: mean frequency and the normalized deviation of frequency. If mean amplitude and the normalized deviation of the amplitude are also used, an even better result may be achieved. The figure also inherently demonstrates that formation boundaries can be determined from acoustic characteristics. FIGS. 7 and 8 demonstrate the feasibility of building a petrophysical properties evaluation algorithm 303 (FIG. 2) which can be used to evaluate processed forms of the sound generated by operationally engaging the drilling bit with the rock being drilled.

In some embodiments, acoustic sensors may be installed in a drilling fluid circulation system of a drilling rig to record acoustic drilling signals in real-time. The drill sounds, termed as drilling acoustic signals, may transmit toward the surface along the drilling fluid both inside the drill string and the annulus to be recorded by the acoustic sensors located in the drilling fluid circulation system. The recorded drilling acoustic signals are processed and analyzed to determine lithology type and petrophysical properties of the rock under drilling in real time. The determined real time lithology type and petrophysical properties may be used in various applications, such as steering a drill bit (geosteering), casing shoe positioning, etc.

Figure 9:
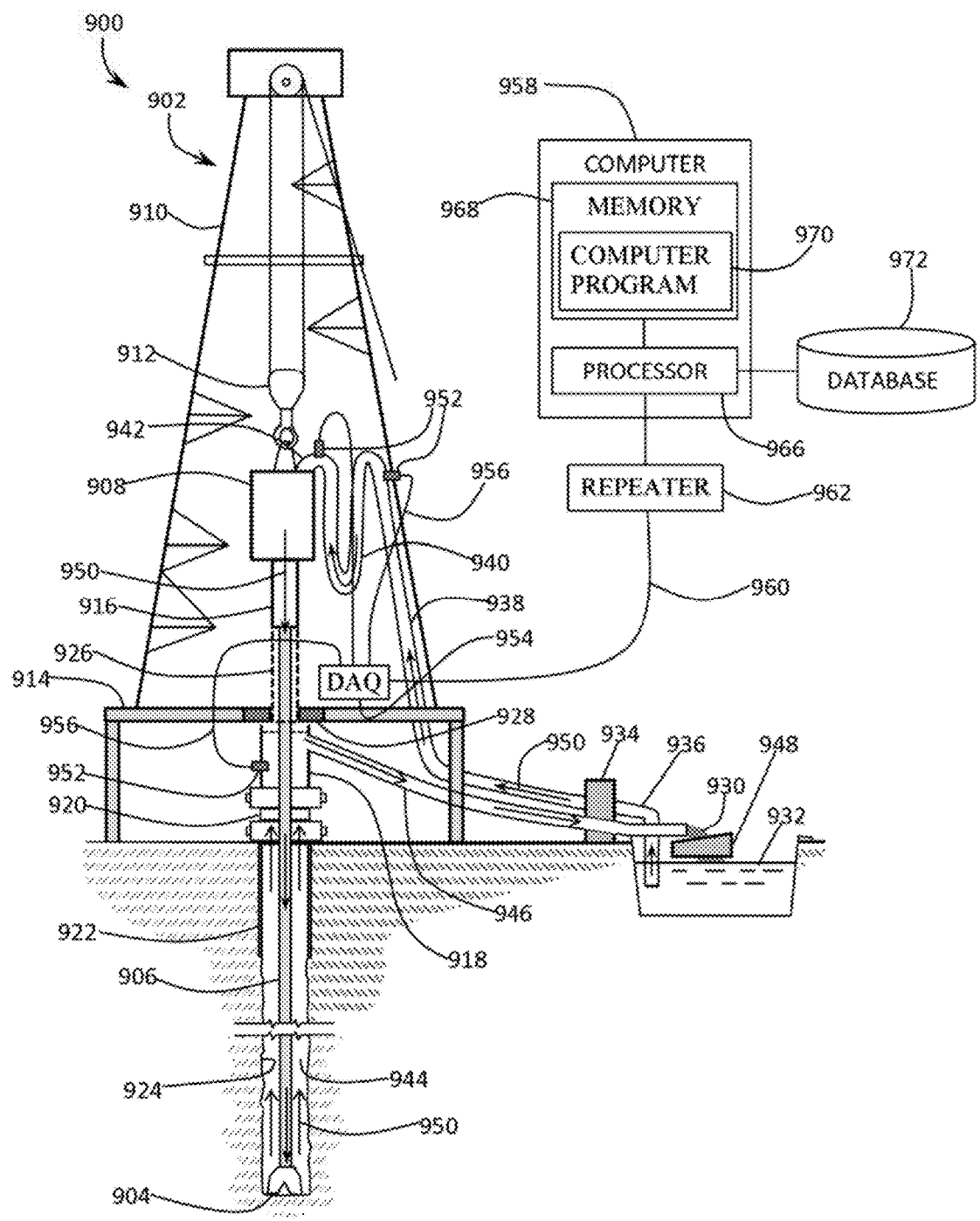
FIG. 9 is a schematic diagram of a general architecture of an apparatus for identifying rock properties in real-time during drilling according to another embodiment of the present invention.

FIG. 9 depicts the setup of an example apparatus 900 for identifying rock properties in real-time during drilling. The apparatus 900 may be attached to a drilling rig 902. As will be appreciated, the drilling rig 902 may be a top drive drilling rig or a rotary table drilling rig. Embodiment of the apparatus 900 described in the disclosure may be used with a top drive drilling rig, a rotary table drilling rig, or any other type of drilling rig in which drilling fluid (for example, drilling mud) is used to circulate drilling cuttings out of the well. FIG. 9 depicts some components of a drilling rig that may be applicable to numerous types of drilling rigs and are thus illustrative of embodiments of the apparatus 900.

As will be appreciated, drilling of a well is achieved by the rotational action of a drill bit 904. The drill bit 904 is connected to a downhole end of a drill string 906. In a top drive drilling rig, the rotational action of the drill bit 904 is achieved by a top drive 908 that rotates the drill string 906. The top drive 908 of the drilling rig 902 may be suspended in a derrick 910 by a traveling block 912. The derrick 910 is supported on a rig floor 914.

A drive shaft 916 is located in the center of the top drive 908 and may be connected to the top pipe of the drill string 906 via a threaded connection. The drill string 906 runs through a bell nipple 918, a blowout preventer (BOP) 920, and a casing head 922. The rotation of the top drive 908 rotates the drive shaft 916, causing rotation of the drill string 906 and the drill bit 904 to cut rock at the bottom of a borehole 924. As will be appreciated, a rotary table drilling rig may rotate a drill string via the coupling between a kelly drive 926 and a rotary table 928.

During drilling, the produced cuttings from drilling (for example, small rock fragments broken by the drill bit) are carried to the surface by a drilling fluid 930. As will be appreciated, the drilling fluid 930 may provide multiple functions, including exerting a hydrostatic pressure sufficient to prevent formation fluids from entering the borehole 924 and to keep the borehole 924 stable.

The drilling fluid 930 may be circulated by a drilling fluid circulation system. For example, the drilling fluid 930 may be pumped from a drilling fluid reserve pit 932 by pumps 934, and the drilling fluid circulation system may include various components for controlling and routing the drilling fluid. For example, the drilling fluid may be pumped through a flowline 936, a standpipe 938, a kelly hose 940, a gooseneck 942, a wash pipe assembly (not shown) for a top drive drilling rig, the drive shaft 916, a swivel (not shown) and the kelly drive 926 for a rotary table drilling rig, and down the drill string 906. At the bottom of the borehole 924 the drilling fluid flows through the drill bit 904 and then up the annulus 944, the casing head 922, the BOP 920, and the bell nipple 918. From the bell nipple 918, the drilling fluid is directed through a mud return line 946 to a solids removal equipment 948 for removal of cuttings and release into the drilling fluid reserve pit 932. Thus, the drilling fluid is continuously circulating, as shown by arrows 950 that generally indicate the direction of circulation of the drilling fluid.

During drilling of a well, drill sounds are generated as a result of the drill bit's engagement with rock. In operation, the drilling acoustic signals are generated when the drill bit 904 bites rocks at the bottom of a borehole 924. When drilling into different lithologies or the same lithology with different physical properties (for example, lithology type, porosity, water saturation, permeability, presence of hydrocarbons, presence of fractures, etc.) the generated drill sounds are distinctly different. The drill sounds (also referred to as "drilling acoustic signals) transmit upward along the drilling fluid both inside the drill string 906 and the annulus 944.

As described in the disclosure, the apparatus 900 records and analyzes the drilling acoustic signals on the surface. As shown in FIG. 9, acoustic sensors 952 are installed in a drilling fluid circulation system. For example, the acoustic sensors 952 may be coupled to the bell nipple 918, the standpipe 938, the gooseneck 942, or any combination thereof. For example, in some embodiments, one or more acoustic sensors may be coupled to the bell nipple 918, one or more acoustic sensors may be coupled to the standpipe 938, and one or more acoustic sensors may be coupled to the gooseneck 942. In other embodiments, the acoustic sensors 952 may additionally or alternatively be coupled to other components of the drilling fluid circulation system.

Different acoustic sensors 952 may be used such as, for example, accelerometers, measurement microphones, contact microphones, and hydrophones. In some embodiments, one or more (for example, each) acoustic sensor 952 may include a built-in amplifier or may be connected directly to an amplifier (not shown). In such embodiment, the drilling acoustic signals picked up by the acoustic sensors 952 may be amplified first by the amplifier before being transmitted to a data acquisition unit (DAQ) 954.

As shown in FIG. 9, the apparatus 900 includes the data acquisition unit (DAQ) 954 which, in some embodiments, may be connected to the acoustic sensors 952 via electronic cables 956. The drilling acoustic signals received by the acoustic sensors 952 may be amplified and then transmitted to the data acquisition unit 954. The data acquisition unit 954 may be connected to a computer 958 through an electronic cable 960. The data acquisition unit 954 samples the acoustic signal in analog format and then converts the analog acoustic signals into digital data (shown in FIG. 10). In some embodiments, a repeater 962 may be installed in the electronic cable 960 to relay the data from the data acquisition unit 954 to the computer 958 if the distance between the data acquisition unit 954 and the computer 958 exceeds a maximum specified distance of the electronic cable 960.

As shown in FIG. 9, the computer includes a processor 966 and a memory 968 (that is, a non-transitory machine readable medium) accessible by the processor. The memory 968 includes a computer program 970 (that is, a petrophysical properties analyzing program).

Figure 10:
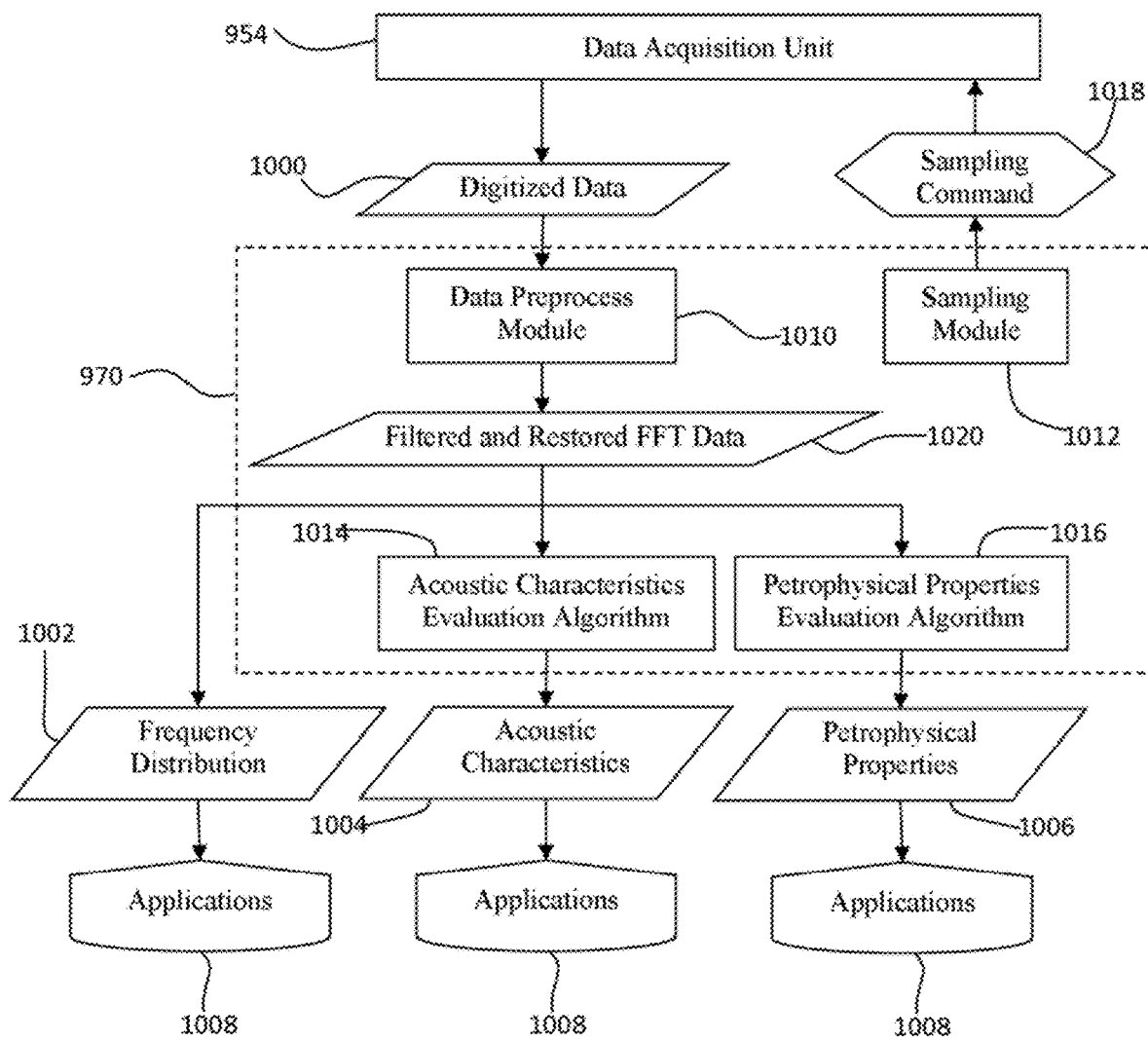
FIG. 10 is a schematic diagram showing a data processing procedure performed by a computer program according to another embodiment of the present invention.

FIG. 10 depicts a data processing procedure performed by the computer program 970 according to an embodiment of the present disclosure. As shown in FIGS. 9 and 10, digitized data 1000 may be read by the computer program 970 (for example, a petrophysical properties analyzing program), installed in memory 968 accessible by the processor 966.

The computer program 970 analyzes the digitized data 1000 to derive a frequency distribution 1002, acoustic characteristics 1004, and petrophysical properties 1006 of the rock undergoing drilling. The respective results, for example, frequency distribution 1002, acoustic characteristics 1004, and petrophysical properties 1006, can be used in various applications 1008 to include lithology identification, drill bit steering, formation boundary identification, and other applications. As shown in FIG. 9, such data along with rock sample data, rock modeling data, etc. can be stored in a database 972 stored in the internal memory 968 or an external memory accessible to the processor 966.

The computer 958 can be in the form of a personal computer or in the form of a server or server farm serving multiple user interfaces or other configurations known to those skilled in the art. The computer program 970 can be in the form of microcode, programs, routines, and symbolic languages that provide a specific set or sets of ordered operations that control the functioning of the hardware and direct its operation, as known and understood by those skilled in the art. The computer program 970, according to an embodiment of the present disclosure, need not reside in its entirety in volatile memory, but can be selectively loaded, as necessary, according to various methodologies as known and understood by those skilled in the art.

In operation, when the drilling acoustic signals are generated at the drill bit 904, they transmit toward the surface through the drilling fluid 930 both inside the drill string 906 and the annulus 944. The drilling acoustic signals transmitted in the drilling fluid are picked up by the acoustic sensors 952 attached to the bell nipple 918, the standpipe 938, the gooseneck 942, other components of the drilling fluid circulation system, or any combination thereof. The drilling acoustic signals picked up by the acoustic sensors 952, after being amplified, are sent through electronic wires 956 to the data acquisition unit (DAQ) 954. The acoustic signals are digitized by the data acquisition unit 954 and then sent to the computer 958 for analysis by the petrophysical properties analyzing program 970. The digitized acoustic signals are first transformed into frequency domain by using Fourier transformation. The frequency distribution data are further evaluated for acoustic characteristics. The frequency distribution, characteristics of the acoustic signals, or both may then be used to identify lithology and to evaluate petrophysical properties of the rock under drilling in real time, as described in the disclosure.

FIG. 10 further illustrates components of the computer program 970 in accordance with an embodiment of the disclosure. An embodiment of the computer program 970 may include a data preprocess module 1010, a data sampling module 1012, an acoustic characteristics evaluation algorithm 1014, and a petrophysical properties evaluation algorithm 1016. The sampling module 1012 sends sampling commands 1018, such as sampling rate, to the data acquisition unit 954 for data sampling control. The data preprocess module produces filtered and restored Fast Fourier Transform (FFT) data 1020 in accordance with techniques of the present disclosure.

Figure 11:
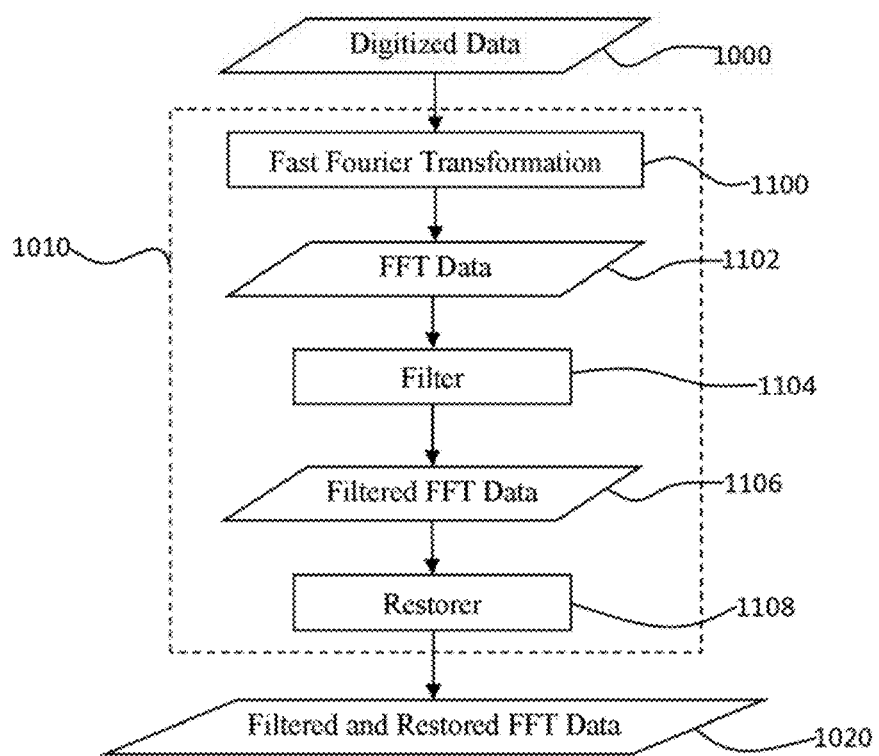
FIG. 11 is a schematic diagram illustrating major components of a data preprocess module according to another embodiment of the present invention.

FIG. 11 depicts processing by the data preprocess module 1010 in accordance with an embodiment of the disclosure. As shown in FIG. 11, the digitized data 1000 in the time domain is transformed into Fast Fourier Transform (FFT) data 1102 (that is, data in the frequency domain) by a Fast Fourier Transformation 1100. The FFT data 1102 is then filtered by a filter 1104 to remove some low and high frequency data points, low amplitude data points, or both generated from other sources, i.e. from sources other than the bit cutting into the rocks. The filtered FFT data 1106 is restored by the restorer 1108 to produce filtered and restored FFT data 1020. The main part of the filtered and restored FFT data 1020 is the frequency distribution 1002, which is the frequency and amplitude information of a sampled acoustic signal. As discussed infra, two examples of such signal are shown in FIGS. 4A and 4B for the frequency distribution for a limestone and the frequency distribution for a dolomite respectively.

As the drilling acoustic signals transmit toward the surface through the drilling fluid 930, the signals attenuate. As will be appreciated, the attenuation in a liquid generally is frequency and temperature dependent. For example, the higher the frequency, the stronger the attenuation. As discussed in the disclosure, the attenuated drilling acoustic signals maybe restored in order to maximally represent the sounds generated by the drill bit 904. As shown in Equation 6, the sound amplitude with initial value $P_0$ will attenuate to a lower value P after transmission over a distance d:

$$P = P_0 10^{\frac{-\alpha d}{20}} \qquad (6)$$

Where $\alpha$ is a coefficient of attenuation in decibels per meter (dB/m).

The restoration of the drilling acoustic signals may be performed by deriving the initial sounds amplitude $P_0$ from the measured value P at a different frequency, as shown by Equation 7:

$$P_0 = P 10^{\frac{\alpha d}{20}} \qquad (7)$$

The attenuation in the drilling fluid may also be dependent on the density of the drilling fluid. For a particular drilling fluid, the relationship between the coefficients of attenuation $\alpha$, the drilling fluid density $\rho$, sound frequencies f and drilling fluid temperatures T may be expressed according to Equation 8:

$$\alpha = \text{function}(f, \rho, T) \qquad (8)$$

Equation 8 may be referred to as a "drilling fluid attenuation coefficient function." In some embodiments, the coefficients of attenuation $\alpha$ at different the drilling fluid densities $\rho$, sound frequencies f, and drilling fluid temperatures T may be measured using known techniques. In such embodiments, the drilling fluid attenuation coefficient function expressed by Equation 8 may be constructed from the measurements.

The restorer 1108 of the data preprocess module 1010 may restore a drilling signal using the sounds amplitude of the filtered FFT data 1106 and the drilling fluid attenuation coefficient function. To restore a drilling signal, the initial amplitude at each frequently may be restored from the filtered FFT data 1106 using Equation 7, with the attenuation coefficient determined using the drilling fluid attenuation coefficient function expressed by Equation 8.

The filtered and restored FFT data 1020 is in the frequency domain and, as shown in FIG. 10, may include frequency distribution 1002 that is output from the computer program 970. The frequency distribution of the two different types of carbonates shown in FIGS. 4A and 4B illustrate how the frequency distribution can be used directly to identify lithologies and to determine formation boundaries during drilling real time (that is, when drilling through a formation boundary rock lithology changes). Identification of lithologies may be used to define hydrocarbon reservoir location and thickness, in geosteering to keep drilling within a production zone during lateral drilling, and in other applications. Determination of a formation boundary in real-time may improve casing shoe positioning and increase drilling safety.

According to embodiments of the disclosure, the acoustic characteristics evaluation algorithm 1014 evaluates the filtered and restored FFT data 1020 for select acoustic characteristics, such as, for example, mean frequency, normalized deviation of frequency, mean amplitude, normalized deviation of amplitude, and apparent power. These acoustic characteristics for an acoustic signal sample may be defined according to Equations 1-5 described supra.

The mean frequency and the normalized deviation of frequency characterize the frequency distribution, while the mean amplitude and the normalized deviation of amplitude characterize the loudness level of the drilling sound. Apparent power represents the power of the acoustic signals. In some embodiments, the acoustic characteristics may be calculated within a whole range or a partial range of the frequency of the acoustic samples. The range may be selected to achieve the maximum difference of these characteristics among different lithologies.

The derived acoustic characteristics 1004 can be used directly for certain applications 1008, such as lithology type identification or formation boundary determination. In some embodiments, the mean frequency, the normalized deviation of frequency, the mean amplitude, the normalized deviation of amplitude, the apparent power of the rock undergoing drilling, or any combination thereof, can be compared with a corresponding mean frequency, normalized deviation of frequency, mean amplitude, normalized deviation of amplitude and apparent power of a plurality of rock samples, or any combination thereof having different known lithologies to determine an amount of correlation of the acoustic characteristics associated with the rock undergoing drilling and the acoustic characteristics associated with the rock samples. The lithology type of the rock undergoing drilling can be determined using the correlation. For example, the mean frequency and the normalized deviation of frequency for the rock undergoing drilling may be compared with mean frequency and normalized deviation of frequency for rock samples having different lithologies to identify the lithology type of the rock undergoing drilling. In some embodiments, the location of a formation boundary may be determined in real-time from the comparison, such as by changes in lithology type of the rock undergoing drilling. In some embodiments, the optimal location of a casing show for a casing associated with the drill string may be determined based on the location of the formation boundary. In some embodiments, the mean frequency, the normalized deviation of frequency, the mean amplitude, the normalized deviation of amplitude, and the apparent power for the rock undergoing drilling may be compared with the mean frequency, the normalized deviation of frequency, the mean amplitude, the normalized deviation of amplitude, and the apparent power for rock samples having different known lithologies to identify the lithology type of the rock undergoing drilling.

When each of the five acoustic characteristics 1004 is plotted along depth, each acoustic characteristic represents the property variation along depth for the rocks in the well. Conventional well logs, such as gamma ray logs, density logs, or sonic logs and the like, may also be plotted along depth to show the lithology type and properties variation along depth. In such embodiments, the acoustic characteristics 1004 may be combined with the conventional well logs to enhance the evaluation of lithology type and properties.

The petrophysical properties evaluation algorithm 1016 of the computer program 970 evaluates the filtered and restored FFT Data 1020 to derive petrophysical properties 1006. The petrophysical properties may include lithology types and physical properties of the rock under drilling, such as porosity, permeability, oil presence, and fractures. In some embodiments, the location of a formation boundary may be determined in real-time from the petrophysical properties of the rock undergoing drilling, such as by changes in the petrophysical properties. In some embodiments, the optimal location of a casing show for a casing associated with the drill string may be determined based on the location of the formation boundary.

Figure 12:
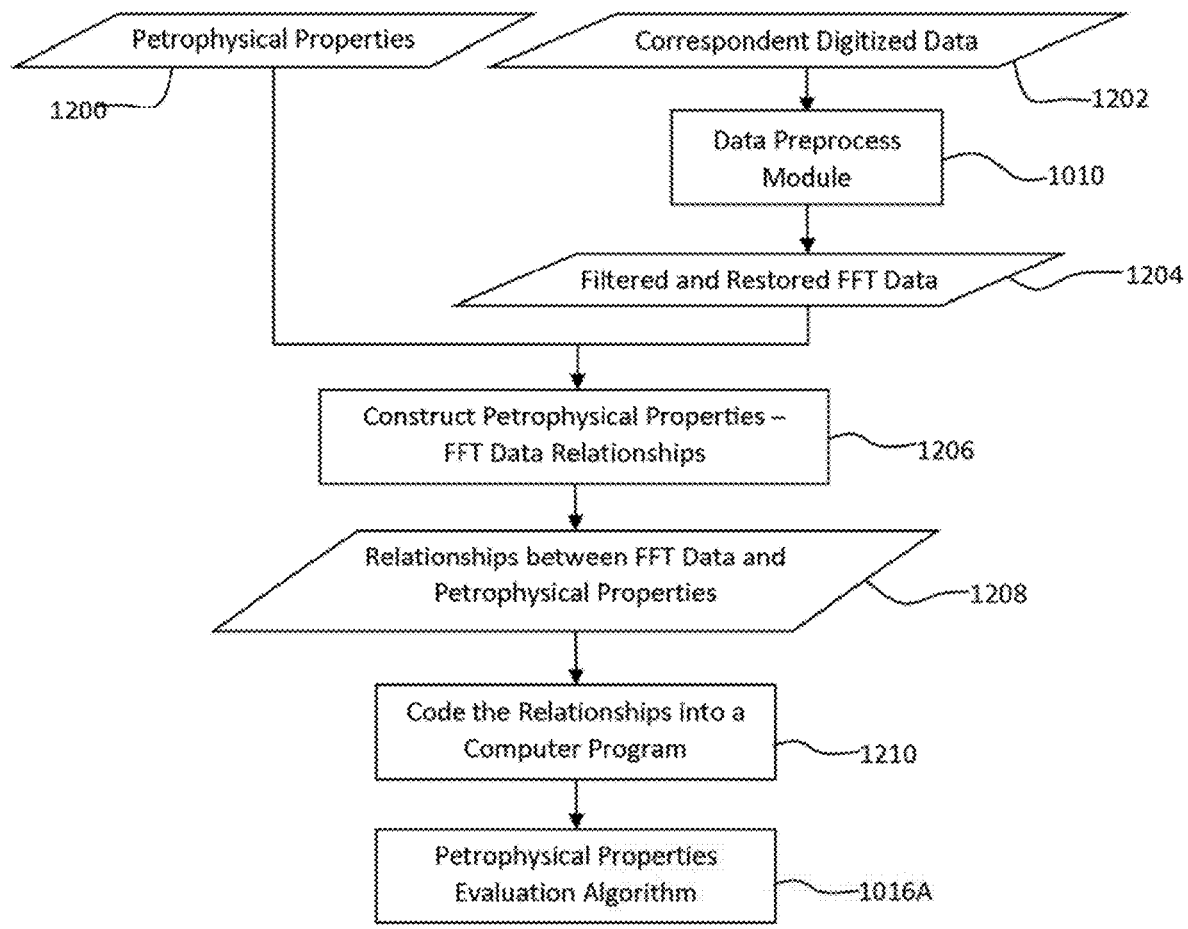
FIG. 12 is a schematic flow diagram illustrating steps for forming a petrophysical properties evaluation algorithm for a particular type of drill bit according to another embodiment of the present invention.
Figure 13:
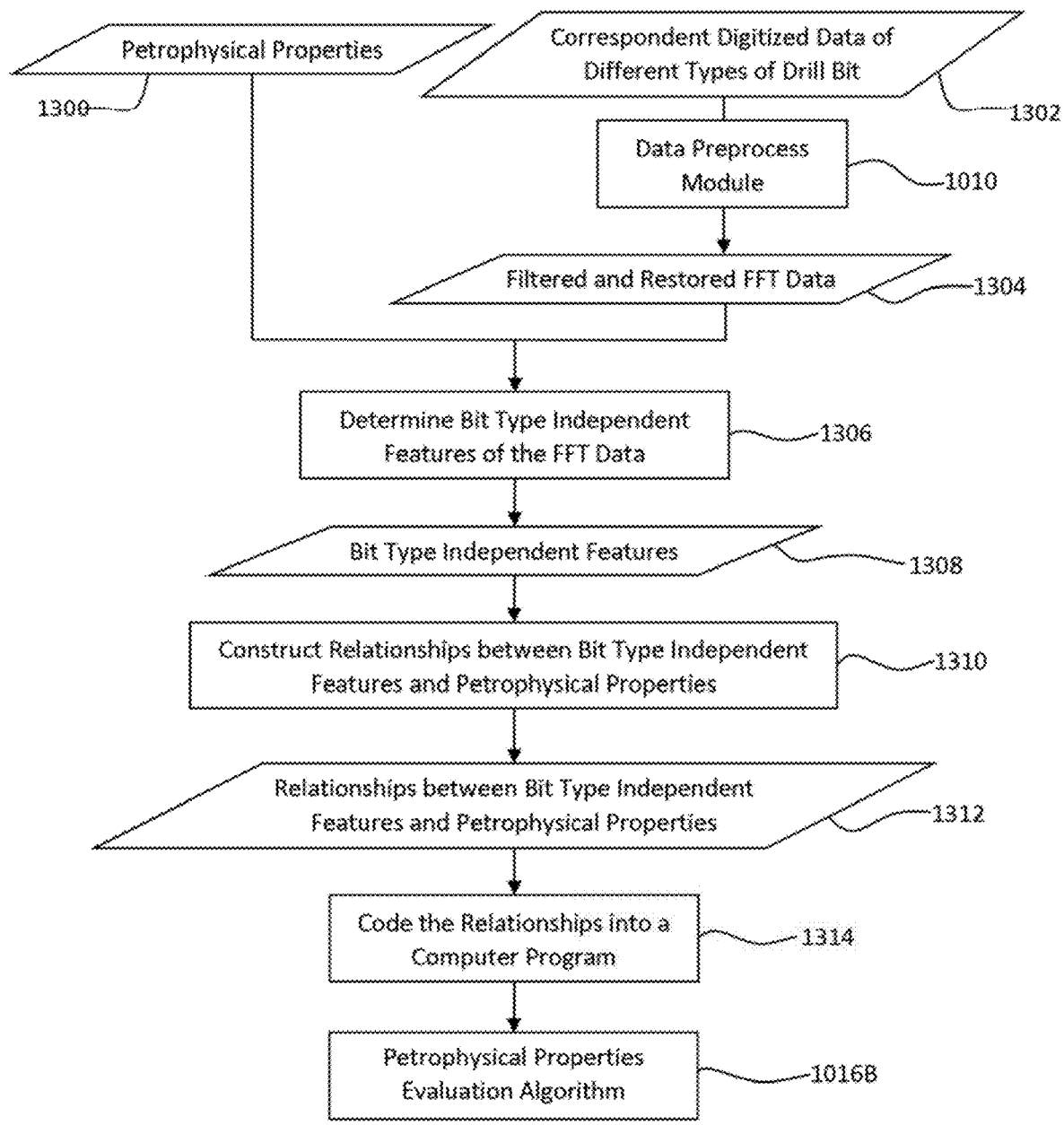
FIG. 13 is a schematic flow diagram illustrating steps for forming a drill bit independent petrophysical properties evaluation algorithm according to another embodiment of the present invention

FIGS. 12 and 13 illustrate examples of the construction of two types of petrophysical properties evaluation algorithms 1016: one designed for a particular type of drill bit shown at 1016A and the other designed to be drill bit type independent shown at 1016B. Unlike the acoustic characteristics evaluation algorithm 1014, which may be based on known mathematical equations, the petrophysical properties evaluation algorithm 1016 may be based on mathematical models, which are to be built utilizing acoustic data and petrophysical properties according to the techniques described in the disclosure.

FIG. 12 illustrates the procedure for constructing a "Petrophysical Properties Evaluation Algorithm" for a particular type of drill bit. According to the exemplary configuration, datasets of petrophysical properties 1200 and correspondent digitized acoustic data 1202 for a particular drill bit are collected. The digitized acoustic data 1202 is preprocessed by the data preprocess module 1010 (illustrated in FIGS. 10 and 11) to produce the filtered and restored FFT data 1204. The relationships 1208 between filtered and restored FFT data 1204 and petrophysical properties 1200 are constructed (step 1206) using suitable mathematical modeling techniques, such as, multiple regression analysis or artificial neural networks modeling. Once relationships 1208 between the filtered and restored FFT data 1204 and petrophysical properties 1200 are constructed, the relationships are coded (step 1210) to produce a computer program, module, subroutine, object, or other type of instructions to define the petrophysical properties evaluation algorithm 1016A. The algorithm 1016A is then available to be used in the computer program 970 to predict the petrophysical properties from drilling acoustic signals for the particular drill bit type.

FIG. 13 illustrates the procedure for constructing a drill bit type independent "Petrophysical Properties Evaluation Algorithm" 1016B. The datasets of petrophysical properties 1300 and the correspondent digitized acoustic data 1302 measured from different types of drill bit are collected. The digitized acoustic data 1302 is preprocessed by the data preprocess module 1010 (illustrated in FIGS. 10 and 11) to produce the filtered and restored FFT data 1304. Bit type independent features 1308 of the filtered and restored FFT data 1304 are then determined by comparing the filtered and restored FFT data of different types of drill bit and the correspondent petrophysical properties 1300 (step 1306). Features which have weakest correlation with the drill bit types and strong correlation with the petrophysical properties are the bit-type independent ones. The relationships 1312 between the petrophysical properties 1300 and the bit type independent features 1308 are constructed (step 1310) using suitable mathematical modeling techniques, such as, for example, multiple regression analysis or artificial neural networks modeling. The constructed relationships 1312 are then coded (step 1314) into a computer program, module, subroutine, object, or other type of instructions to define the petrophysical properties evaluation algorithm 1016B. The algorithm 1016B is then available to be used in the computer program 970 to predict the petrophysical properties from drilling acoustic signals.

Embodiments of the apparatus 900 provide several advantages, such as the identification of lithology type and physical properties in real-time. The advantages provided by embodiments of the apparatus 900 makes such embodiments ideal in the applications of (1) horizontal and lateral well drill steering and (2) locating the relative position for setting the casing shoe at a much higher precision. Embodiments may also be used to (3) detect fractured zones; and (4) interpret rock lithologies and petrophysical properties. Further, embodiments of the apparatus 900 beneficially supply more information for evaluating petrophysical properties of the rocks, such as porosity, strength, and presence of hydrocarbons, through the use of data obtained through the analysis of acoustic signals to evaluate these petrophysical properties. Such data is beneficially beyond that which can be supplied via conventional techniques such as well logs.

Some embodiments of the apparatus 900 may exclude the petrophysical properties evaluation algorithm 1016, as the frequency distribution 1002 and acoustic characteristics 1004 may be used in various applications. Such application may include identifying lithology type and formation boundaries, correlating lithology formations at different well locations, steering lateral well drilling, etc., by comparing the frequency distribution 1002 and acoustic characteristics 1004 of the rock undergoing drilling with those collected in the upper sections of the well undergoing drilling (that is, an "on-the-fly" application) or from a database with known lithology types and petrophysical properties.

In embodiments of the disclosure, the petrophysical properties evaluation algorithms 1016 may be constructed easily as 1) drilling acoustic signal data used in the model construction may be easily and automatically collected on surface; and 2) the constructed algorithms 1016 may be installed in a computer on the surface.

Various embodiments of the present disclosure provide several advantages. For example, various embodiments of the present disclosure beneficially provide a means to identify lithology type and physical properties, truly in real-time. This advantage makes various embodiments of the present disclosure ideal in the applications of (1) horizontal and lateral well drill steering and (2) locating the relative position for setting the casing shoe at a much higher precision. Various embodiments can also be used to (3) detect fractured zones; and (4) interpret rock lithologies and petrophysical properties. Various embodiments of the present disclosure beneficially supply more information for evaluating petrophysical properties of the rocks, such as porosity, strength, and presence of hydrocarbons, through the utilization of data obtained through the analysis of acoustic signals to evaluate these petrophysical properties. Such data can beneficially be beyond that which can be conventionally supplied.

This application is a continuation-in-part of and claims priority to and the benefit of U.S. Non-Provisional patent application Ser. No. 13/554,369 titled "Methods Of Evaluating Rock Properties While Drilling Using Downhole Acoustic Sensors And A Downhole Broadband Transmitting System" filed on Jul. 20, 2012, which is a non-provisional of and claims priority to and the benefit of U.S. Provisional Patent Application No. 61/539,171, titled "Methods Of Evaluating Rock Properties While Drilling Using Downhole Acoustic Sensors And A Downhole Broadband Transmitting System," filed on Sep. 26, 2011, and is related to U.S. patent application Ser. No. 13/554,019, filed on Jul. 20, 2012, titled "Apparatus, Computer Readable Medium and Program Code for Evaluating Rock Properties While Drilling Using Downhole Acoustic Sensors and Telemetry System"; U.S. patent application Ser. No. 13/553,958, filed on Jul. 20, 2012, titled "Methods of Evaluating Rock Properties While Drilling Using Downhole Acoustic Sensors and Telemetry System"; U.S. patent application Ser. No. 13/554,298, filed on Jul. 20, 2012, titled "Apparatus for Evaluating Rock Properties While Drilling Using Drilling Rig-Mounted Acoustic Sensors"; and U.S. patent application Ser. No. 13/554,470, filed on Jul. 20, 2012, titled "Methods for Evaluating Rock Properties While Drilling Using Drilling Rig-Mounted Acoustic Sensors"; U.S. patent application Ser. No. 13/554,077, filed on Jul. 20, 2012, titled "Apparatus, Computer Readable Medium, and Program Code For Evaluating Rock Properties While Drilling Using Downhole Acoustic Sensors and a Downhole Broadband Transmitting System; U.S. Provisional Patent Application No. 61/539,165, titled "Apparatus And Program Product For Evaluating Rock Properties While Drilling Using Downhole Acoustic Sensors And A Downhole Broadband Transmitting System," filed on Sep. 26, 2011; U.S. Provisional Patent Application No. 61/539,201, titled "Apparatus For Evaluating Rock Properties While Drilling Using Drilling Rig-Mounted Acoustic Sensors," filed on Sep. 26, 2011; U.S. Provisional Patent Application No. 61/539,213, titled "Methods For Evaluating Rock Properties While Drilling Using Drilling Rig-Mounted Acoustic Sensors," filed on Sep. 26, 2011; U.S. Provisional Patent Application No. 61/539,242 titled "Apparatus And Program Product For Evaluating Rock Properties While Drilling Using Downhole Acoustic Sensors And Telemetry System," filed on Sep. 26, 2011; and U.S. Provisional Patent Application No. 61/539,246 titled "Methods Of Evaluating Rock Properties While Drilling Using Downhole Acoustic Sensors And Telemetry System," filed on Sep. 26, 2011, each incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. An apparatus for determining properties of rock in a formation in real-time during drilling, the apparatus comprising:
   an acoustic sensor installed in a drilling fluid circulation system of a drilling rig, the acoustic sensor coupled to one of the following: (i) a bell nipple, (ii) a gooseneck, or (iii) a standpipe, wherein the acoustic sensor is operable to detect an acoustic signal generated real-time as a result of rotational contact of a drill bit with rock during drilling and transmitted through the drilling fluid;
   a data acquisition unit in communication with the acoustic sensor and a computer, wherein the data acquisition unit is operable to sample the raw acoustic sensor data and digitize the raw acoustic sensor data, the raw acoustic sensor data representing the acoustic signal generated real-time as a result of rotational contact of a drill bit with rock during drilling;

the computer in communication with the data acquisition unit and configured to perform the following operations:

receiving the digitized acoustic sensor data from the data acquisition unit;

processing the digitized acoustic sensor data received from the data acquisition unit, the processing comprising:

deriving a plurality of acoustic characteristics from the digitized acoustic sensor data, the plurality of acoustic characteristics including mean frequency and normalized deviation of frequency; and comparing the mean frequency and the normalized deviation of frequency for the rock undergoing drilling with mean frequency and normalized deviation of frequency for a plurality of rock samples having different known lithologies;

identifying a lithology type of the rock undergoing drilling responsive to the comparing.

2. The apparatus of claim 1, wherein the plurality of acoustic characteristics further include mean amplitude, normalized deviation of amplitude, and apparent power, wherein the operations comprise:

comparing the mean frequency, the normalized deviation of frequency, the mean amplitude, and the normalized deviation of amplitude, and the apparent power for the rock undergoing drilling with mean frequency, normalized deviation of frequency, mean amplitude, normalized deviation of amplitude, and apparent power for a plurality of rock samples having different known lithologies.

3. The apparatus of claim 1, comprising an amplifier connected to the acoustic sensor, wherein the amplifier is operable to amplify the raw acoustic sensor data before being received by the data acquisition unit.

4. The apparatus of claim 1, wherein the acoustic sensor comprises a first acoustic sensor coupled to the bell nipple of the drilling fluid circulation system.

5. The apparatus of claim 4, wherein the acoustic sensor comprises a second acoustic sensor coupled to the gooseneck of the drilling fluid circulation system.

6. The apparatus of claim 5, wherein the acoustic sensor comprises a third acoustic sensor coupled to the standpipe of the drilling fluid circulation system.

7. An apparatus for determining properties of rock in a formation in real-time during drilling, the apparatus comprising:

an acoustic sensor installed in a drilling fluid circulation system of a drilling rig, the acoustic sensor coupled to one of the following: (i) a bell nipple, (ii) a gooseneck, or (iii) a standpipe, wherein the acoustic sensor is operable to detect an acoustic signal generated real-time as a result of rotational contact of a drill bit with rock during drilling and transmitted through the drilling fluid;

a data acquisition unit in communication with the acoustic sensor and a computer, wherein the data acquisition unit is operable to sample the raw acoustic sensor data and digitize the raw acoustic sensor data, the raw acoustic sensor data representing the acoustic signal generated real-time as a result of rotational contact of a drill bit with rock during drilling;

the computer in communication with the data acquisition unit and configured to perform the following operations:

receiving digitized acoustic sensor data from the data acquisition unit, the raw acoustic sensor data representing the acoustic signal generated real-time as a result of rotational contact of a drill bit with rock during drilling;

processing the raw acoustic sensor data received from the acoustic sensor, the processing comprising:

transforming the digitized data into Fast Fourier Transform (FFT) data using a Fast Fourier transformation;

filtering the FFT data; and restoring the FFT data to compensate for attenuation by the drilling fluid;

determining petrophysical properties of rock being encountered by the drill bit using a petrophysical properties evaluation algorithm employable to predict one or more petrophysical properties of rock undergoing drilling from the filtered and restored FFT data.

8. The apparatus of claim 7, comprising an amplifier connected to the acoustic sensor, wherein the amplifier is operable to amplify the raw acoustic sensor data before being received by the data acquisition unit.

9. The apparatus of claim 7, wherein the processing comprises:

sending sampling commands to the data acquisition unit in communication with the one or more acoustic sensors;

converting analog acoustic signals into digitized data through employment of the data acquisition unit.

10. The apparatus of claim 7, wherein the one or more petrophysical properties comprise: lithology type, porosity, water saturation, and permeability of rock undergoing drilling.

11. The apparatus of claim 7, wherein the petrophysical properties evaluation algorithm is a bit-specific petrophysical properties evaluation algorithm, the processing comprising:

collecting petrophysical properties data describing one or more petrophysical properties of rock and correspondent acoustic data for a preselected type of drill bit;

processing the collected acoustic data to produce filtered and restored FFT data;

determining one or more relationships between features of the filtered and restored FFT data and correspondent one or more petrophysical properties of rock for each type of drill bit;

coding the determined relationships into computer program code defining the petrophysical properties algorithm.

12. The apparatus of claim 7, wherein the petrophysical properties evaluation algorithm is a bit-independent petrophysical properties evaluation algorithm, the processing comprising:

collecting petrophysical properties data describing one or more petrophysical properties of rock and correspondent acoustic data for a plurality of different types of drill bits;

processing the collected acoustic data to produce filtered and restored FFT data;

determining bit-type independent features of the filtered and restored FFT data;

determining one or more relationships between the bit-type independent features of the filtered and restored FFT data and correspondent one or more petrophysical properties of the rock; and coding the determined relationships into computer program code defining the petrophysical properties algorithm.

13. The apparatus of claim 7, wherein the acoustic sensor comprises a first acoustic sensor coupled to the bell nipple of the drilling fluid circulation system.

14. The apparatus of claim 13, wherein the acoustic sensor comprises a second acoustic sensor coupled to the gooseneck of the drilling fluid circulation system.

15. The apparatus of claim 14, wherein the acoustic sensor comprises a third acoustic sensor coupled to the standpipe of the drilling fluid circulation system.

16. A method for determining properties of rock in a formation in real-time during drilling using a drilling fluid, the method comprising:
    detecting, by an acoustic sensor, an acoustic signal generated real-time as a result of rotational contact of a drill bit with rock during drilling and transmitted through the drilling fluid, the acoustic sensor installed in a drilling fluid circulation system of a drilling rig, and coupled to one of the following: (i) a bell nipple, (ii) a gooseneck, or (iii) a standpipe;
    digitizing, by a data acquisition unit, the raw acoustic sensor data;
    processing, at a computer in communication with the data acquisition unit, the digitized acoustic sensor data received from the data acquisition unit, the processing comprising:
        deriving a plurality of acoustic characteristics from the digitized acoustic sensor data, the plurality of acoustic characteristics including mean frequency and normalized deviation of frequency; and
        comparing the mean frequency and the normalized deviation of frequency for the rock undergoing drilling with mean frequency and normalized deviation of frequency for a plurality of rock samples having different known lithologies; and
    identifying a lithology type of the rock undergoing drilling responsive to the comparing.

17. The method of claim 16, comprising amplifying the raw acoustic sensor data by an amplifier before being received by the data acquisition unit.

18. The method of claim 16, wherein the plurality of acoustic characteristics further include mean amplitude, normalized deviation of amplitude, and apparent power, wherein the method comprises:
    comparing the mean frequency, the normalized deviation of frequency, the mean amplitude, the normalized deviation of amplitude, and the apparent power for the rock undergoing drilling with mean frequency, normalized deviation of frequency, mean amplitude, normalized deviation of amplitude, and apparent power for a plurality of rock samples having different known lithologies.

19. The method of claim 16, comprising determining a location of a formation boundary encountered during drilling responsive to the comparing.

20. The method of claim 19, comprising determining an optimal location of a casing shoe for a casing associated with a drill string based on the location of the formation boundary.

21. The method of claim 16, wherein the acoustic sensor comprises a first acoustic sensor coupled to the bell nipple of the drilling fluid circulation system.

22. The method of claim 21, wherein the acoustic sensor comprises a second acoustic sensor coupled to the gooseneck of the drilling fluid circulation system.

23. The method of claim 22, wherein the acoustic sensor comprises a third acoustic sensor coupled to the standpipe of the drilling fluid circulation system.

24. A method for determining properties of rock in a formation in real-time during drilling using a drilling fluid, the method comprising:
    detecting, by an acoustic sensor, an acoustic signal generated real-time as a result of rotational contact of a drill bit with rock during drilling and transmitted through the drilling fluid, the acoustic sensor installed in a drilling fluid circulation system of a drilling rig, and coupled to one of the following: (i) a bell nipple, (ii) a gooseneck, or (iii) a standpipe;
    digitizing, by a data acquisition unit, the raw acoustic sensor data;
    processing, at a computer in communication with the data acquisition unit, the digitized acoustic sensor data received from the data acquisition unit, the processing comprising:
        transforming the digitized data into Fast Fourier Transform (FFT) data using a Fast Fourier transformation;
        filtering the FFT data; and
        restoring the FFT data to compensate for attenuation by the drilling fluid;
    determining petrophysical properties of rock being encountered by the drill bit using a petrophysical properties evaluation algorithm employable to predict one or more petrophysical properties of rock undergoing drilling from the filtered and restored FFT data.

25. The method of claim 24, comprising amplifying the raw acoustic sensor data by an amplifier before being received by the data acquisition unit.

26. The method of claim 24, wherein the one or more petrophysical properties comprise: lithology type, porosity, water saturation, and permeability of rock undergoing drilling.

27. The method of claim 24, wherein the petrophysical properties evaluation algorithm is a bit-specific petrophysical properties evaluation algorithm, the method comprising:
    collecting petrophysical properties data describing one or more petrophysical properties of rock and correspondent acoustic data for a preselected type of drill bit;
    processing the collected acoustic data to produce filtered and restored FFT data;
    determining one or more relationships between features of the filtered and restored FFT data and correspondent one or more petrophysical properties of rock for each type of drill bit;
coding the determined relationships into computer program code defining the petrophysical properties algorithm.

28. The method of claim 24, wherein the petrophysical properties evaluation algorithm is a bit-independent petrophysical properties evaluation algorithm, the method comprising:
    collecting petrophysical properties data describing one or more petrophysical properties of rock and correspondent acoustic data for a plurality of different types of drill bits;
    processing the collected acoustic data to produce filtered and restored FFT data;
    determining bit-type independent features of the filtered and restored FFT data;
    determining one or more relationships between the bit-type independent features of the filtered and restored FFT data and correspondent one or more petrophysical properties of the rock; and coding the determined relationships into computer program code defining the petrophysical properties algorithm.

29. The method of claim 24, comprising determining a location of a formation boundary encountered during drilling based on the determined petrophysical properties of the rock undergoing drilling.

30. The method of claim 29, comprising determining an optimal location of a casing shoe for a casing associated with a drill string based on the location of the formation boundary.

31. The method of claim 24, wherein the acoustic sensor comprises a first acoustic sensor coupled to the bell nipple of the drilling fluid circulation system.

32. The method of claim 24, wherein the acoustic sensor comprises a second acoustic sensor coupled to the gooseneck of the drilling fluid circulation system.

33. The method of claim 24, wherein the acoustic sensor comprises a third acoustic sensor coupled to the standpipe of the drilling fluid circulation system.

* * * * *